(12) United States Patent
Hedløy

(10) Patent No.: US 7,917,843 B2
(45) Date of Patent: *Mar. 29, 2011

(54) METHOD, SYSTEM AND COMPUTER READABLE MEDIUM FOR ADDRESSING HANDLING FROM A COMPUTER PROGRAM

(75) Inventor: Atle Hedløy, Madrid (ES)

(73) Assignee: Arendi S.A.R.L., Luxembourg (LU)

( * ) Notice: Subject to any disclaimer, the term of this patent is extended or adjusted under 35 U.S.C. 154(b) by 394 days.

This patent is subject to a terminal disclaimer.

(21) Appl. No.: 12/182,048

(22) Filed: Jul. 29, 2008

(65) Prior Publication Data

US 2008/0313159 A1    Dec. 18, 2008

Related U.S. Application Data

(63) Continuation of application No. 09/923,134, filed on Aug. 6, 2001, now Pat. No. 7,496,854, which is a continuation of application No. 09/189,626, filed on Nov. 10, 1998, now Pat. No. 6,323,853.

(30) Foreign Application Priority Data

Sep. 3, 1998 (NO) .......................... 984066

(51) Int. Cl.
*G06F 17/00* (2006.01)
(52) U.S. Cl. ........ 715/230; 715/234; 715/711; 715/752; 715/825; 715/853
(58) Field of Classification Search .................... 715/230
See application file for complete search history.

(56) References Cited

U.S. PATENT DOCUMENTS 3,350,695 A    10/1967    Kaufman et al. .......... 340/172.5
(Continued)

FOREIGN PATENT DOCUMENTS

EP    0 093 250 A2    9/1983
(Continued)

OTHER PUBLICATIONS

Person et al., "Special Edition Using Microsoft Word 97" by Que Publisher Pub. date Dec. 16, 1996, pp. 475-514.*

(Continued)

*Primary Examiner* — Doug Hutton
*Assistant Examiner* — Quoc A Tran
(74) *Attorney, Agent, or Firm* — Sunstein Kann Murphy & Timbers LLP

(57) ABSTRACT

A method, system and computer readable medium for providing for providing a function item, such as a key, button, icon, or menu, tied to a user operation in a computer, whereby a single click on the function item in a window or program on a computer screen, or one single selection in a menu in a program, initiates retrieval of name and addresses and/or other person or company related information, while the user works simultaneously in another program, e.g., a word processor. The click on the function item initiates a program connected to the button to search a database or file available on or through the computer, containing the person, company or address related data, in order to look up data corresponding to what the user types, or partly typed, e.g., name and/or address in the word processor, the correct data from the database, data related to the typed data, e.g., the name of the person, company, or the traditional or electronic address, or other person, or company, or address related data, and alternatively the persons, companies, or addresses, are displayed and possibly entered into the word processor, if such related data exists.

44 Claims, 14 Drawing Sheets

U.S. PATENT DOCUMENTS

| | | | | |
|---|---|---|---|---|
| 4,270,182 A | 5/1981 | Asija | | 364/900 |
| 4,674,065 A | 6/1987 | Lange et al. | | 364/900 |
| 5,226,117 A | 7/1993 | Miklos | | 395/157 |
| 5,267,155 A | 11/1993 | Buchanan et al. | | 364/419.14 |
| 5,331,555 A | 7/1994 | Hashimoto et al. | | 364/419.07 |
| 5,355,472 A | 10/1994 | Lewis | | 395/600 |
| 5,375,200 A | 12/1994 | Dugan et al. | | 395/159 |
| 5,388,150 A | 2/1995 | Schneyer et al. | | 379/67 |
| 5,392,386 A | 2/1995 | Chalas | | 395/155 |
| 5,416,901 A | 5/1995 | Torres | | 395/159 |
| 5,491,783 A | 2/1996 | Douglas et al. | | 395/159 |
| 5,491,784 A | 2/1996 | Douglas et al. | | 395/159 |
| 5,491,785 A | 2/1996 | Robson et al. | | 395/162 |
| 5,495,565 A | 2/1996 | Millard et al. | | 395/146 |
| 5,500,859 A | 3/1996 | Sharma et al. | | 370/81 |
| 5,530,853 A | 6/1996 | Schell et al. | | 395/600 |
| 5,546,447 A | 8/1996 | Skarbo et al. | | 379/142 |
| 5,566,330 A | 10/1996 | Sheffield | | 395/600 |
| 5,576,955 A | 11/1996 | Newbold et al. | | 395/795 |
| 5,579,467 A | 11/1996 | Capps | | 395/768 |
| 5,587,911 A | 12/1996 | Asano et al. | | 364/444.2 |
| 5,606,712 A | 2/1997 | Hidaka | | 395/800 |
| 5,634,121 A | 5/1997 | Tracz et al. | | 395/602 |
| 5,640,565 A | 6/1997 | Dickinson | | 395/683 |
| 5,666,502 A | 9/1997 | Capps | | 345/352 |
| 5,708,804 A | 1/1998 | Goodwin et al. | | 395/603 |
| 5,724,597 A | 3/1998 | Cuthberson et al. | | 395/793 |
| 5,732,229 A | 3/1998 | Dickinson | | 395/334 |
| 5,732,395 A | 3/1998 | Alexander Silverman | | 704/260 |
| 5,734,871 A | 3/1998 | Kleinerman et al. | | 395/500 |
| 5,742,905 A | 4/1998 | Pepe et al. | | 455/461 |
| 5,754,636 A | 5/1998 | Bayless et al. | | 379/142 |
| 5,761,656 A | 6/1998 | Ben-Shachar | | 707/4 |
| 5,761,663 A | 6/1998 | Lagarde et al. | | 707/10 |
| 5,774,887 A | 6/1998 | Wolff et al. | | 707/1 |
| 5,778,367 A | 7/1998 | Wesinger, Jr. et al. | | 707/10 |
| 5,781,189 A | 7/1998 | Holleran et al. | | 345/335 |
| 5,787,451 A | 7/1998 | Mogilevsky | | 707/533 |
| 5,793,972 A | 8/1998 | Shane | | 395/200.49 |
| 5,794,228 A | 8/1998 | French et al. | | 707/2 |
| 5,794,259 A | 8/1998 | Kikinis | | 707/507 |
| 5,799,302 A | 8/1998 | Johnson et al. | | 707/7 |
| 5,805,886 A | 9/1998 | Skarbo et al. | | 395/685 |
| 5,805,911 A | 9/1998 | Miller | | 395/796 |
| 5,815,830 A | 9/1998 | Anthony | | 707/6 |
| 5,826,257 A | 10/1998 | Snelling, Jr. | | 707/4 |
| 5,835,089 A | 11/1998 | Skarbo et al. | | 345/335 |
| 5,859,636 A * | 1/1999 | Pandit | | 715/204 |
| 5,860,073 A | 1/1999 | Ferrel et al. | | 715/255 |
| 5,864,848 A | 1/1999 | Horvitz et al. | | 707/6 |
| 5,873,107 A | 2/1999 | Borovoy et al. | | 707/501 |
| 5,873,108 A | 2/1999 | Goyal et al. | | 707/507 |
| 5,884,309 A | 3/1999 | Vanechanos, Jr. | | 707/10 |
| 5,893,093 A | 4/1999 | Wills | | 707/5 |
| 5,896,321 A | 4/1999 | Miller et al. | | 365/189.01 |
| 5,896,533 A | 4/1999 | Ramos et al. | | 395/680 |
| 5,907,838 A | 5/1999 | Miyasaka et al. | | 707/4 |
| 5,913,214 A | 6/1999 | Madnick et al. | | 707/10 |
| 5,923,848 A | 7/1999 | Goodhand et al. | | 395/200.4 |
| 5,924,074 A | 7/1999 | Evans | | 705/3 |
| 5,924,090 A | 7/1999 | Krellenstein | | 707/5 |
| 5,926,808 A | 7/1999 | Evans et al. | | 707/3 |
| 5,930,471 A | 7/1999 | Milewski et al. | | 395/200.04 |
| 5,930,764 A | 7/1999 | Melchione et al. | | 705/10 |
| 5,940,484 A | 8/1999 | DeFazio et al. | | 379/142 |
| 5,946,647 A | 8/1999 | Miller et al. | | 704/9 |
| 5,946,679 A | 8/1999 | Ahuja et al. | | 707/3 |
| 5,999,938 A | 12/1999 | Bliss et al. | | 707/102 |
| 6,006,218 A | 12/1999 | Breese et al. | | 707/3 |
| 6,006,351 A | 12/1999 | Peretz et al. | | 714/751 |
| 6,012,075 A | 1/2000 | Fein et al. | | 707/540 |
| 6,018,571 A | 1/2000 | Langlois et al. | | 379/207 |
| 6,021,403 A | 2/2000 | Horvitz et al. | | 706/45 |
| 6,026,398 A | 2/2000 | Brown et al. | | 707/5 |
| 6,028,605 A | 2/2000 | Conrad et al. | | 345/354 |
| 6,067,565 A | 5/2000 | Horvitz | | 709/218 |
| 6,081,788 A | 6/2000 | Appleman et al. | | 705/14 |
| 6,085,201 A * | 7/2000 | Tso | | 715/205 |
| 6,085,226 A | 7/2000 | Horvitz | | 709/203 |
| 6,092,074 A | 7/2000 | Rodkin et al. | | 707/102 |
| 6,108,686 A | 8/2000 | Williams | | 709/202 |
| 6,151,584 A | 11/2000 | Papierniak et al. | | 705/10 |
| 6,178,411 B1 | 1/2001 | Reiter | | 705/408 |
| 6,182,133 B1 | 1/2001 | Horvitz | | 709/223 |
| 6,192,380 B1 | 2/2001 | Light et al. | | 707/505 |
| 6,208,975 B1 | 3/2001 | Bull et al. | | 705/14 |
| 6,233,570 B1 | 5/2001 | Horvitz et al. | | 706/11 |
| 6,253,188 B1 | 6/2001 | Witek et al. | | 705/14 |
| 6,260,035 B1 | 7/2001 | Horvitz et al. | | 706/60 |
| 6,262,730 B1 | 7/2001 | Horvitz et al. | | 345/337 |
| 6,285,987 B1 | 9/2001 | Roth et al. | | 705/27 |
| 6,304,881 B1 | 10/2001 | Halim et al. | | 707/201 |
| 6,317,761 B1 | 11/2001 | Landsman et al. | | 707/513 |
| 6,323,853 B1 | 11/2001 | Hedloy | | 345/339 |
| 6,338,957 B2 | 1/2002 | Onishi et al. | | 435/108 |
| 6,373,940 B2 | 4/2002 | Shaffer et al. | | 379/355.02 |
| 6,377,965 B1 | 4/2002 | Hachamovitch et al. | | 707/534 |
| 6,385,592 B1 | 5/2002 | Angles et al. | | 705/14 |
| 6,421,693 B1 | 7/2002 | Nishiyama et al. | | 707/507 |
| 6,499,021 B1 | 12/2002 | Abu-Hakima | | 706/10 |
| 6,651,217 B1 | 11/2003 | Kennedy et al. | | 715/507 |
| 6,738,615 B1 | 5/2004 | Chow et al. | | 455/415 |
| 6,826,407 B1 | 11/2004 | Helferich | | 455/466 |
| 7,039,599 B2 | 5/2006 | Merriman et al. | | 705/14 |
| 7,051,019 B1 | 5/2006 | Land et al. | | 707/4 |
| 7,136,853 B1 | 11/2006 | Kohda et al. | | 707/6 |
| 7,155,451 B1 | 12/2006 | Torres | | 707/104.1 |
| 7,216,292 B1 | 5/2007 | Snapper et al. | | 715/507 |
| 7,272,604 B1 | 9/2007 | Hedloy | | 707/10 |
| 7,496,854 B2 | 2/2009 | Hedloy | | 715/780 |
| 7,505,974 B2 | 3/2009 | Gropper | | 707/10 |
| 7,509,349 B2 | 3/2009 | Celik | | 707/200 |
| 2002/0054092 A1 | 5/2002 | Hedloy | | 345/748 |
| 2002/0188683 A1 | 12/2002 | Lytle et al. | | 709/206 |
| 2003/0033288 A1 | 2/2003 | Shanahan et al. | | 707/3 |
| 2006/0047644 A1 | 3/2006 | Bocking et al. | | 707/4 |
| 2007/0244907 A1 | 10/2007 | Hedloy | | 707/10 |
| 2008/0313159 A1 | 12/2008 | Hedloy | | 707/3 |
| 2010/0211600 A2 * | 8/2010 | Hedloy | | 707/770 |
| 2010/0281354 A1 | 11/2010 | Hedloy | | 715/220 |

FOREIGN PATENT DOCUMENTS

| | | |
|---|---|---|
| EP | 1 630 642 | 3/2006 |
| GB | 2196454 | 4/1988 |
| GB | 2 318 703 | 4/1998 |
| WO | WO 97/21183 | 6/1997 |
| WO | WO 98/16890 | 4/1998 |
| WO | WO 98/19259 | 5/1998 |
| WO | WO 98/34391 | 8/1998 |

OTHER PUBLICATIONS

Plotkin, David, *Address for Success*, Bay Area Computer Currents, p. 36-38, Mar. 21, 1995.

CTAGS(1) Manual Page.

Wilson, Eve, *Guiding Lawyers: Mapping Law into Hypertext*, Artificial Intelligence Review 6, pp. 161-189, 1992.

MacWEEK Report, Aug. 8, 1996.

Langberg, Mike, *Show of Potential Apple Breaks New Ground by Displaying What's on its Drawing Board 'Innovation is at the Heart of What We Do'*, San Jose Mercury News, Aug. 7, 1996, p. 1C.

Anind K. Dey, et al., CyberDesk: The Use of Perception in Context-Aware Computing, PUI Workshop Submission, Proc. Of 1997 Workshop on Perceptual User Interfaces (PUI '97), pp. 26-27, Oct. 1997.

Dey, Anind K., *Context-Aware Computing: The CyberDesk Project*, Future Computing Environments, AAAI '98 Spring Symposium, Stanford University, pp. 51-55, Mar. 23-25, 1998.

Anind K. Dey, et al., *CyberDesk: A Framework for Providing Self-Integrating Context-Aware Services*, Knowledge-Based Systems, vol. 11, No. 1, pp. 3-13, Sep. 1998.

L. Nancy Garrett, et al., *Intermedia: Issues, Strategies, and Tactics in the Design of a Hyermedia Document System*, pp. 163-174, © 1986.

Langberg, Mike, *'Innovation Is at the Heart of What We Do', Apple Breaks New Ground by Displaying What's on it's Drawing Board*, Mercury News, pp. 1-2, Aug. 7, 1996.

Henry Lieberman, et al., Training Agents to Recognize Text by Example, Proc. of the Third Annual Conference on Autonomous Agents, Seattle, WA, 1999, pp. 116-122.

Bonnie A. Nardi, et al., Collaborative, Programmable Intelligent Agents, Website, pp. 1-11, Mar. 1998.

Addressmate Automatic Envelope Addressing Program, User's Manual, 88 pages, © 1991.

Brown, Peter, Unix Guide, 1 page, 1995.

N.D. Beitner, et al., Multimedia Support and Authoring in Microcosm: an Extended Model, 12 pages, no date available.

McMahon, Lee E., SED—A Non-interactive Text Editor, Bell Laboratories, 10 pages, Aug. 15, 1978.

SED(1), BSD Reference Manual Page, 6 pages, Dec. 30, 1993.

AddressMate for Windows, Version 2.0, Product Box and License Agreement, 24 pages, no date available.

"AddressMate Incorporates Correction Capability," The New York Law Publishing Company, 1 page, Jan. 1996.

Mar. 1996 Reviews, website available at www.techweb.com/winmag/library/1996/0396/03rvh002.htm, 9 pages.

Magid, Lawrence J., "Addressing the Matter of Labels," Los Angeles Times, 2 pages, Sep. 23, 1996.

Important Note for New AddressMate Users, 1 page, no date available.

Important Tips for LabelWriter Owners Using AddressMate, 3 pages, Jan. 1995.

Addressing the Issues, 4 pages, Jun. 24, 1993.

"Whye Do it the Olde Way" AddressMate Advertisement, 2 pages, no date available.

Robinson, Philip, "The Envelope, Please: It's AddressMate,"San Jose Mercury News, Sunday, 1 page, Jul. 19, 1992.

Supkoff, Steve, AddressMate, PCM, 2 pages, Aug. 1992.

Shannon, L.R., "Addressing Envelopes," The New York Times, 1 page, Tuesday, Jul. 14, 1992.

Schwabach, Bob, "Addressing for Success," On Computers Column, 1 page, Mar. 16, 1992.

INFOWORLD, p. 15, Mar. 16, 1992.

Hart, Ken, Simplify Envelope Printing with AddressMate, Computer Shopper, 1 page, no date available.

"Colvin's Beta-Testing of AddressMate Sparks Developer's Appreciation," Westview, 1 page, Apr. 6, 1992.

Press Release: AddressMate Software Automatically Addresses and Bar Codes Envelopes to Save Time and Money, 2 pages, Mar. 9, 1992.

Long, George M., Letter to Mr. David Block, 1 page, Nov. 11, 1994.

Damiano, Philip J., Letter to Mr. David Block, 2 pages, Jan. 5, 1994.

Kahn, Ed, "Envelope Addressing Finally Simplified AddressMate Does Addressing and Much More," Microtimes, 3 pages, Nov. 27, 1995.

Bernthal, Kristen, "LabelWriter XL Plus," PC Catalog, 1 page, Aug. 18, 1995.

Address Fixer for Microsoft Word and Office, Product Box, 10 pages, no date available.

AddressMate Plus, Product Box and License Agreement, 16 pages, no date available.

Getting Results with Microsoft Office for Windows 95, Version 7.0, 635 pages, © 1995-1997.

Getting Results with Microsoft Office 97, 701 pages, © 1995-1997.

Microsoft Word, User's Guide, Version 6.0, 449 pages, © 1993-1994.

CTAGS(1) Manual Page, 3 pages, Oct. 11, 1993 (Last Change).

Bernstein, Matt, An Apprentice that Discovers Hypertext Links, pp. 213-223, not date available.

Contextual Manu Manager/Apple Data Detectors, 5 pages, no date available.

P.J. Brown et al., A Help System Based on UNIX Help Manual, 7 pages, Feb. 1987.

Charles H. Franke III, et al., Authoring a Hypertext Unix Help Manual, 8 pages, © 1995.

Brown, P.J., Guide User Manual, 1985, sixteenth impression, 55 pages, Apr. 1995.

Wilson, Eve, "Cases for Justus: Preparing a Case Database for a Hypertext Information Retrieval System," Literary and Linguistic Computing, vol. 5, No. 2, 11 pages, 1990.

John Robertson, et al., The Hypermedia Authoring Research Toolkit, ECHT '94 proceedings, pp. 177-185, Sep. 1994.

What is Wiki and Wiki History webpages, available at wiki.org/wiki.cgi?WhatIsWiki and www.c2.org/cgi/wiki?WikiHistory, 8 pages, no date available.

Wilson, Eve, Integrated Information Retrieval for Law in a Hypertext Environment, Annual ACM Conference on Research and Development in Information Retrieval, INRIA, 23 pages, 1988.

Multimedia Hyperlinks Automatically Created for Reference Documents, Research Disclosure, 2 pages, Jun. 1993.

Wiki Wiki Origin, http://www.c2.com/cgi/wiki?WikiWikiOrigin, 2 pages, no date available.

Blak, Joy-Lyn, WikiWikiWeb, Computer World, 4 pages, Jan. 29, 2001.

Microsoft's Supplemental Responses to Arendi's Interrogatories, in *Arendi USA et al.* v. *Microsoft Corporation*, Civil Action 02-CV-343 (ECT) from the United States District Court for the District of Rhode Island, 4 pages, Apr. 7, 2003.

"Apple Introduces Internet Address Detectors," Press Release, 3 pages, 2 pages, Sep. 8, 1997.

Cunningham, Cara, "Apple Kicks Off Macworld with Talk of Revival," new software demos, InfoWorld Electric, 2 pages, Aug. 7, 1996.

Staten, James, "Apple Looks to the Future," MacWeek, 2 pages, Aug. 7, 1996.

Simmons, Mark, "Striking a Key Note,"Mac Addict Online, 5 pages, Aug. 8, 1996.

Miller, Jim, Email regarding Apple Data Detectors, 1 page, Jan. 8, 1997.

Apple Data Detectors—Now Shipping web page, 5 pages, Jan. 6, 1997.

The Apple Data Detectors FAQ, 8 pages, Jan. 6, 1997.

Apple Data Detector Webpages, available on web.archive.org/web/20020601164217/www.apple.com/applescript/data_detectors, 15 pages, © 2002.

Apple Data Detectors 1.0.2 Read Me, 3 pages, no date available.

Developer's Guide to Apple Data Detectors, 34 pages, Dec. 1, 1997.

AppleScript Editors, Utilities & Environments, available at www.applescriptsourcebook.com/links/applescripteditors.html, 4 pages, dated Jan. 11, 2004.

eMailman Internet Address Detectors, 3 pages, © 1996-2000.

Tannehill, Steve, News from Jul. 1997, 6 pages, Jul. 31, 1997.

Control-Click! The Archive, 2 pages, © 1997-2000.

Contextual Menus: One of the System 8's Greatest Features, in ApplePress, 10 pages, no date available.

Trygve's CMM Plug-Ins Home, available at Web.archive.org/web/19980130053511/www.bombaydigital.com/cmms, 7 pages, no date available.

ADD Depot, available from Web.archive.org/web/20000819091818/http://homepage.mac.com/Mathewmiller/add, 4 pages, Jan. 12, 2004.

Press Release: Apple Introduces Internet Address Detectors, 4 pages, Sep. 8, 1997.

Apple Introduces Internet Address Detectors, Newsbytes, 11 pages, Sep. 29, 1997.

Williams, Greg, Strategy Mosaic: Understanding Apple's Dual OS Strategy, 7 pages, no date available.

"Taking [control] of your Mac with System 8," The MacAuthority, 6 pages, Jan. 1998.

Apple Data Detectors 1.0.2, TidBITS Updates, 1 page, Mar. 8, 1998.

Apple Data Detectors 1.0.2, TidBITS #419, 1 page, Mar. 9, 1998.

Engst, Tanya, More on Context on Contextual Menus, tidbits #399, 2 pages, Sep. 29, 1997.

Engst, Tanya, Of Mice and Menus, TidBITS #399, 3 pages, Sep. 22, 1997.

Whaley, Charles, "Will This be Enough to Kick-Start Apple?," Computing Canada, 4 pages, Aug. 4, 1997.

MacOS8.com—Mac OS 8 Indepth, 3 pages, no date available.

"A Farewell to the Apple Advanced Technology Group," SIGCHI, vol. 30, No. 2, 3 pages, Apr. 1998.

James R. Miller, et al., From Documents to Objects, in SIGCHI, vol. 30, No. 2, 11 pages, Apr. 1998.

Thomas Bonura et al., Drop Zones, in SIGCHI, vol. 30, No. 2, 8 pages, Apr. 1998.

United States Court of Appeals for the Federal Circuit, Appeal from the United States District Court for the District of Rhode Island in Case No. 02-CV-343, Judge Ernest C. Torres, Brief for the Defendant-Cross Appellant Frank E. Scherkenbach, 59 pages, Jul. 7, 2005.
United States District Court for the District of Rhode Island, 02-CV-343 (ECT), Defendant Microsoft Corporation's Motion for Judgment as a Matter of Law that the '853 Patent is Invalid, 16 pages, Oct. 15, 2004.
United States District Court for the District of Rhode Island, Civ. A. No. 02-CV-343 (ECT), Plaintiff's Reply Memorandum in Support of their Motion for New Trial, Francis A. Connor, 9 pages, Nov. 4, 2004.
United States Court of Appeals for the Federal Circuit, Arendi Reply Brief, 37 pages, Sep. 2, 2005.
United States District Court for the District of Rhode Island, 02-CV-343 (ECT), Memorandum in Support of Defendant Microsoft Corporation's Opposition to Arendi's Motion for a New Trial, Patricia A. Sullivan,15 pages, Oct. 27, 2004.
United States Court of Appeals for the Federal Circuit, Appeal from the United States District Court for the District of Rhode Island, 02-CV-343 (ECT), Brief of Plaintiffs-Appellants Arendi U.S.A., Inc. and Arend Holding Limited, Donald R. Dunner, 61 pages, Apr. 25, 2005.
United States Court of Appeals for the Federal Circuit, Appeal from the United States District Court for the District of Rhode Island, 02-CV-343 (ECT), Reply Brief for Defendant-Cross Appellant, Frank E. Scherkenbach, 27 pages, Oct. 3, 2005.
United States District Court for the District of Rhode Island, Order Denying Defendant Microsoft Corporation's Motion for Judgment as a Matter of Law That the '853 Patent is Invalid, C.A. No. 02-343T, Ernest C. Torres, Chief Judge, 6 pages, Nov. 30, 2004.
United States District Court for the District of Rhode Island, C.A. No. 02-343T, Order Denying Plaintiffs' Motion for New Trial, Ernest C. Torres, Chief Judge, 18 pages, Nov. 30, 2004.
*Arendi USA, Inc. et al.* vs. *Microsoft Corporation, et al.* C.A. No. 02-343T Court Transcript from 2:00 PM, 48 pages, Sep. 13, 2004, Providence, RI.
*Arendi USA, Inc. et al.* vs. *Microsoft Corporation, et al.* C.A. No. 02-343T Court Transcript from Sep. 14, 2004, 165 pages, Providence, RI.
*Arendi USA, Inc. et al.* vs. *Microsoft Corporation, et al.* C.A. No. 02-343T Court Transcript from Sep. 15, 2004, 111 pages, Providence, RI.
*Arendi USA, Inc. et al.* vs. *Microsoft Corporation, et al.* C.A. No. 02-343T Court Transcript from Sep. 16, 2004, 142 pages, Providence, RI.
*Arendi USA, Inc. et al.* vs. *Microsoft Corporation, et al.* C.A. No. 02-343T Court Transcript from Sep. 17, 2004, 66 pages, Providence, RI.
*Arendi USA, Inc. et al.* vs. *Microsoft Corporation, et al.* C.A. No. 02-343T Court Transcript from Sep. 20, 2004, Providence, RI, 225 pages.
*Arendi USA, Inc. et al.* vs. *Microsoft Corporation, et al.* C.A. No. 02-343T Court Transcript from Sep. 21, 2004, Providence, RI, 170 pages.
*Arendi USA, Inc. et al.* vs. *Microsoft Corporation, et al.* C.A. No. 02-343T Court Transcript from Sep. 22, 2004, Providence, RI, 156 pages.
*Arendi USA, Inc. et al.* vs. *Microsoft Corporation, et al.* C.A. No. 02-343T Court Transcript from Sep. 23, 2004, Providence, RI, 140 pages.
*Arendi USA, Inc. et al.* vs. *Microsoft Corporation, et al.* C.A. No. 02-343T Court Transcript from Sep. 27, 2004, Providence, RI, 17 pages.
*Arendi USA, Inc. et al.* vs. *Microsoft Corporation, et al.* C.A. No. 02-343T Court Transcript from Sep. 28, 2004, Providence, RI, 106 pages.
Novell GroupWise User's Guide for Windows 16-BIT, Version 5.2, Novell, Inc., Orem, Utah, MS 125993, 235 pages, 1993.
Novell GroupWise Webaccess User's Guide, Novell, Inc., Orem, Utah, MS 126785, 37 pages, 1998.
Novell GroupWise User's Guide for Windows 32-BIT, Novell, Inc., Orem, Utah, MS 126463, 322 pages, 1998.

Andrew Wood, et al., "CyberDesk: Automated Integration of Desktop and Network Services", GVU Technical Support, OIT-GVU-97-11, 5 pages, May 1997.
Gregory D. Abowd, et al., "Applying Dynamic Integration as a Software Infrastructure for Context-Aware Computing,"GVU Techincal Report, GIT-GVU-97-18, 21 pages, Sep. 1997.
Gregory D. Abowd, et al., "Context-awareness in Wearable and Ubiquitous Computing," GVU Techincal Report, GIT-GVU-97-11, 13 pages, Mar. 1997.
Apple Data Detectors User's Manual, 16 pages, © 1997.
Apple Internet Address Detectors User's Manual, 16 pages, © 1997.
Apple Introduces Internet Address Detectors, 4 pages, Sep. 8, 1997.
Contextual Menu Manager/Apple Data Detectors, 5 pages, date unavailable.
CoStar User Manual for AddressMate and AddressMate Plus, 219 pages, © 1994-1995.
Anind K. Dey, et al., "CyberDesk: A Framework for Providing Self-Integrating Ubiquitous Software Services," GVU Technical Report, GIT-GVU-97-10, 18 pages, 1997.
Wilson, Eve, "Links and Structures in Hypertext Databases for Law," Proceedings of the First European Conference on Hypertext, INRIA, 20 pages, Nov. 1990.
Milind S. Pandit, et al., "The Selection Recognition Agent: Instance Access to Relevant Information and Operations," Proc. of Intelligent User Interfaces 1997, Orlando, FL, 6 pages, 1997.
Spell, iSpell, Spellout, 71 pages, © 1994.
Microsoft Word 97 Help File entitled "Automatically Check Spelling and Grammar as You Type,"1 page, 2003.
Microsoft Word 97 Help File entitled "Turn Automatic Changes On or Off," 1 page, no date available.
Microsoft Word 97 Help File entitled "Automatically Correct Text," 1 page, no date available.
Microsoft Word 97 Help File entitled "Field Codes: Hyperlink Field," 1 page, no date available.
Microsoft Word 97 Help File entitled "Change the contents of an AutoCorrect Entry," 1 page, no date available.
Excerpt from Jury Charge Transcript for C.A. No. 02-343T, *Arendi USA, Inc. et al.* vs. *Microsoft Corporation et al.*, 45 pages, Sep. 28, 2004.
Microsoft Corporation and Dell Inc.'s Answer, Affirmative Defenses and Counterclaims to Complaint, *Arendi Holding Ltd.* v. *Microsoft Corp. et al.*, C.A. No. 09-119-JJF, from the United States District Court for the District of Delaware, pp. 1-17, Apr. 30, 2009.
"More about The Database," http://c2.com/cgi/wiki?MoreAboutTheDatabase, pp. 1-3, last edited May 7, 2009.
"Ward Cunningham," http://c2.com/cgi/wiki?WardCunningham, pp. 1-15, last edited Apr. 23, 2009.
"Adding New Pages," http://c2.com/cgi/wiki?AddingNewPages, pp. 1-2, last edited Jun. 8, 2009.
"Wiki Wiki Web," http://c2.com/cgi/wiki?WikiWikiWeb, 1 page, last edited Jun. 1, 2009.
Quinlan, Tom, "Apple System Software Branches Out," 1 page, Mar. 16, 1992.
"Introducing AddressMate Plus, The Address Book Manager for Microsoft Word," 4 pages, May 1996.
"Corel Professional Office 7 Quick Results," 534 pages, no date available.
"Getting Results with Microsoft Office for Windows 95," Microsoft, 636 pages, 1995.
"AddressMate for Windows, Adds all the missing pieces to your word processor," 6 pages, no date available.
Opposition against European Patent EP 1 171 836, Letter to the European Patent Office in Preparation for the Oral Proceedings scheduled for May 26, 2009, 31 pages, Mar. 26, 2009.
Opposition against European Patent EP 1 171 836, Auxillary Request 1 Claims, 3 pages, Mar. 26, 2009.
Opposition against European Patent EP 1 171 836, Auxillary Request 2 Claims, 3 pages, Mar. 26, 2009.
Opposition against European Patent EP 1 171 836, Auxillary Request 3 Claims, 3 pages, Mar. 26, 2009.
Opposition against European Patent EP 1 171 836, Auxillary Request 4 Claims, 3 pages, Mar. 26, 2009.

Opposition against European Patent EP 1 171 836, Auxillary Request 5 Claims, 3 pages, Mar. 26, 2009.
Opposition against European Patent EP 1 171 836, Auxillary Request 6 Claims, 3 pages, Mar. 26, 2009.
Opposition against European Patent EP 1 171 836, Auxillary Request 7 Claims, 3 pages, Mar. 26, 2009.
Opposition against European Patent EP 1 171 836, Auxillary Request 8 Claims, 3 pages, Mar. 26, 2009.
Opposition against European Patent EP 1 171 836, Auxillary Request 9 Claims, 3 pages, Mar. 26, 2009.
Opposition against European Patent EP 1 171 836, Auxillary Request 10 Claims, 3 pages, Mar. 26, 2009.
Opposition against European Patent EP 1 171 836, Auxillary Request 11 Claims, 3 pages, Mar. 26, 2009.
Opposition against European Patent EP 1 171 836, Auxillary Request 12 Claims, 3 pages, Mar. 26, 2009.
Opposition against European Patent EP 1 171 836, Auxillary Request 13 Claims, 3 pages, Mar. 26, 2009.
Opposition against European Patent EP 1 171 836, Auxillary Request 14 Claims, 3 pages, Mar. 26, 2009.
Opposition against European Patent EP 1 171 836, Auxillary Request 15 Claims, 3 pages, Mar. 26, 2009.
Opposition against European Patent EP 1 171 836, Auxillary Request 16 Claims, 3 pages, Mar. 26, 2009.
Expert Report of Professor Benjamin Goldberg, 43 pages, dated Mar. 10, 2008.
Supplemental Expert Report of Professor Benjamin Goldberg, 15 pages, May 6, 2008.
Second Supplemental Expert Report of Professor Benjamin Goldberg, 32 pages, Mar. 26, 2009.
Expert Report of Professor Calvin Gidney III, 3 pages, Mar. 26, 2009.
European Patent Office, Summons to Attend Oral Proceedings pursuant to Rule 115(1) EPC, 18 pages, Jan. 23, 2009.
Affidavit of James Miller, 2 pages, Jul. 19, 2006.
Affidavit of David Block, 23 pages, Jul. 21, 2006.
Order Re Claim Construction, in *Arendi U.S.A. Inc. et al. v. Microsoft Corp.*, CA No. 02-343-T, from United States District Court for the District of Rhode Island, 4 pages, Sep. 27, 2004.
Expert Report of W. Bruce Croft, PH.D., in *Arendi U.S.A., Inc. et al. v. Microsoft Corp.*, CA No. 02-CV-343 (ECT), from United States District Court for the District of Rhode Island, 66 pages, Mar. 1, 2004.
Supplemental Expert Report of W. Bruce Croft, PH.D., in *Arendi U.S.A., Inc. et al. v. Microsoft Corp.*, CA No. 02-CV-343 (ECT), from United States District Court for the District of Rhode Island, 42 pages, Jun. 9, 2004.
Affirming Claim Construction Order, in *Arendi USA et al. v. Microsoft Corp.*, No. 05-1170, 05-1171, from Court of Appeals for the Federal Circuit, 1 page, Feb. 8, 2006.
Miller, Jim, "Portfolio; Innovative Interfaces for Information Management," Website: http://www.miramontes.com/portfolio/add/addl.html, 1 page, no date available.
Church, Kenneth et al., "Commercial Applications of Natural Language Processing," 30 pages, Mar. 13, 2003.
Yankelovich, Nichole et al., "Intermedia: The concept and the Construction of a Seamless Information Environment," *Electronic Publishing Technologies*, pp. 81-96, Jan. 1988.
Utting, Kenneth et al., "Context and Orientation in Hypermedia Networks," *AMC Transactions on Information Systems*, vol. 7, No. 1, pp. 58-84, Jan. 1989.
Kahn, Paul, "Linking Together Books: Experiments in Adapting Published Material into Intermedia Documents," *Hypermedia*, vol. 1 No. 2, pp. 1-37, 1989.
Combs, James, "Hypertext, Full-Text and Automatic Linking," pp. 83-98, 1990.
Catlin, Karen Smith et al., "Hypermedia Templates: An Authors Tools," *Hypertext 1991 Proceedings*, pp. 147-160, Dec. 1991.
Meyrowitz, Norman, "The Missing Link, Why We're All Doing Hypertext Wrong," *The Society of Text, Hypertext, Hypermedia, and the Social Construction of Information*, pp. 107-114, no date available.
Halasz, Frank, "Reflections on Notecards: Seven Issues for the Next Generation of Hypermedia Systems," *Hypertext 87 Papers*, pp. 345-365, Nov. 1987.

Haan, Bernard et al., "IRIS Hypermedia Services," pp. 36-51, Jan. 1992.
McKnight, Dillon, "Review, The Textbook of the Future," *Hypertext: a Psychological Perspective*, pp. 19-51, 8 pages, Mar. 1993.
Bouvin, Niels Olof, "Augmenting the Web Through Open Hypermedia," 95 pages, Nov. 2000.
Halasz, Frank et al., "The Dexter Hypertext Reference Model," pp. 95-133, Dec. 7, 1989.
Weinreich, Harald et al., "The Look of the Link—Concepts for the User Interface of Extended Hyperlinks," 10 pages, no date available.
Fountain, Andrew et al., "Microcosm: An Open Model for Hypermedia with Dynamic Linking," *Hypertext: Concept Systems and Applications, Proceedings of the First European Conference on Hypertext*, France, 16 pages, Nov. 1990.
Justus: Wilson, Eve, "Cases for Justus: Preparing a Case Database for a Hypertext Information Retrieval System," *Library and Linguistics Computing*, vol. 5, No. 2, pp. 119-128, 1990.
"Claris Em@iler Getting Started," Claris Corporation, pp. MS112968-MS113028, © 1995-1997.
"OmniPage Pro for Windows 95," Version 7.0 Caere Corporation, pp. MS110194-MS110250, , © 1996.
Moi Khor, Siew, Microsoft Office Excel 2003 Preview, 17 pages, Jun. 2003.
Microsoft Corporation and Dell Inc.'s Invalidity Contentions, in *Arendi Holding Ltd. v. Microsoft Corp*, CA No. 09-119-JJF, from United States District Court for the District of Delaware, pp. 1-26, Aug. 14, 2009.
Exhibit A, in *Arendi Holding Ltd. v. Microsoft Corp*, CA No. 09-119-JJF, from United States District Court for the District of Delaware, pp. 1-35, Aug. 14, 2009.
Exhibit AA, in *Arendi Holding Ltd. v. Microsoft Corp*, CA No. 09-119-JJF, from United States District Court for the District of Delaware, pp. 1-28, Aug. 14, 2009.
Exhibit AAA, in *Arendi Holding Ltd. v. Microsoft Corp*, CA No. 09-119-JJF, from United States District Court for the District of Delaware, pp. 1-33, Aug. 14, 2009.
Exhibit B, in *Arendi Holding Ltd. v. Microsoft Corp*, CA No. 09-119-JJF, from United States District Court for the District of Delaware, pp. 1-33, Aug. 14, 2009.
Exhibit BB, in *Arendi Holding Ltd. v. Microsoft Corp*, CA No. 09-119-JJF, from United States District Court for the District of Delaware, pp. 1-36, Aug. 14, 2009.
Exhibit C, in *Arendi Holding Ltd. v. Microsoft Corp*, CA No. 09-119-JJF, from United States District Court for the District of Delaware, pp. 1-34, Aug. 14, 2009.
Exhibit CC, in *Arendi Holding Ltd. v. Microsoft Corp*, CA No. 09-119-JJF, from United States District Court for the District of Delaware, pp. 1-32, Aug. 14, 2009.
Exhibit D, in *Arendi Holding Ltd. v. Microsoft Corp*, CA No. 09-119-JJF, from United States District Court for the District of Delaware, pp. 1-32, Aug. 14, 2009.
Exhibit DD, in *Arendi Holding Ltd. v. Microsoft Corp*, CA No. 09-119-JJF, from United States District Court for the District of Delaware, pp. 1-22, Aug. 14, 2009.
Exhibit E, in *Arendi Holding Ltd. v. Microsoft Corp*, CA No. 09-119-JJF, from United States District Court for the District of Delaware, pp. 1-33, Aug. 14, 2009.
Exhibit EE, in *Arendi Holding Ltd. v. Microsoft Corp*, CA No. 09-119-JJF, from United States District Court for the District of Delaware, pp. 1-23, Aug. 14, 2009.
Exhibit F, in *Arendi Holding Ltd. v. Microsoft Corp*, CA No. 09-119-JJF, from United States District Court for the District of Delaware, pp. 1-33, Aug. 14, 2009.
Exhibit FF, in *Arendi Holding Ltd. v. Microsoft Corp*, CA No. 09-119-JJF, from United States District Court for the District of Delaware, pp. 1-40, Aug. 14, 2009.
Exhibit G, in *Arendi Holding Ltd. v. Microsoft Corp*, CA No. 09-119-JJF, from United States District Court for the District of Delaware, pp. 1-33, Aug. 14, 2009.
Exhibit GG, in *Arendi Holding Ltd. v. Microsoft Corp*, CA No. 09-119-JJF, from United States District Court for the District of Delaware, pp. 1-32, Aug. 14, 2009.

Exhibit H, in *Arendi Holding Ltd. v. Microsoft Corp*, CA No. 09-119-JJF, from United States District Court for the District of Delaware, pp. 1-33, Aug. 14, 2009.
Exhibit HH, in *Arendi Holding Ltd. v. Microsoft Corp*, CA No. 09-119-JJF, from United States District Court for the District of Delaware, pp. 1-32, Aug. 14, 2009.
Exhibit I-1 through I-6, in *Arendi Holding Ltd. v. Microsoft Corp*, CA No. 09-119-JJF, from United States District Court for the District of Delaware, pp. 1-1800, Aug. 14, 2009.
Exhibit II, in *Arendi Holding Ltd. v. Microsoft Corp*, CA No. 09-119-JJF, from United States District Court for the District of Delaware, pp. 1-34, Aug. 14, 2009.
Exhibit J, in *Arendi Holding Ltd. v. Microsoft Corp*, CA No. 09-119-JJF, from United States District Court for the District of Delaware, pp. 1-89, Aug. 14, 2009.
Exhibit JJ, in *Arendi Holding Ltd. v. Microsoft Corp*, CA No. 09-119-JJF, from United States District Court for the District of Delaware, pp. 1-35, Aug. 14, 2009.
Exhibit K, in *Arendi Holding Ltd. v. Microsoft Corp*, CA No. 09-119-JJF, from United States District Court for the District of Delaware, pp. 1-260, Aug. 14, 2009.
Exhibit KK, in *Arendi Holding Ltd. v. Microsoft Corp*, CA No. 09-119-JJF, from United States District Court for the District of Delaware, pp. 1-34, Aug. 14, 2009.
Exhibit L, in *Arendi Holding Ltd. v. Microsoft Corp*, CA No. 09-119-JJF, from United States District Court for the District of Delaware, pp. 1-190, Aug. 14, 2009.
Exhibit LL, in *Arendi Holding Ltd. v. Microsoft Corp*, CA No. 09-119-JJF, from United States District Court for the District of Delaware, pp. 1-33, Aug. 14, 2009.
Exhibit M, in *Arendi Holding Ltd. v. Microsoft Corp*, CA No. 09-119-JJF, from United States District Court for the District of Delaware, pp. 1-58, Aug. 14, 2009.
Exhibit MM, in *Arendi Holding Ltd. v. Microsoft Corp*, CA No. 09-119-JJF, from United States District Court for the District of Delaware, pp. 1-29, Aug. 14, 2009.
Exhibit N, in *Arendi Holding Ltd. v. Microsoft Corp*, CA No. 09-119-JJF, from United States District Court for the District of Delaware, pp. 1-47, Aug. 14, 2009.
Exhibit NN, in *Arendi Holding Ltd. v. Microsoft Corp*, CA No. 09-119-JJF, from United States District Court for the District of Delaware, pp. 1-30, Aug. 14, 2009.
Exhibit O, in *Arendi Holding Ltd. v. Microsoft Corp*, CA No. 09-119-JJF, from United States District Court for the District of Delaware, pp. 1-51, Aug. 14, 2009.
Exhibit OO, in *Arendi Holding Ltd. v. Microsoft Corp*, CA No. 09-119-JJF, from United States District Court for the District of Delaware, pp. 1-29, Aug. 14, 2009.
Exhibit P, in *Arendi Holding Ltd. v. Microsoft Corp*, CA No. 09-119-JJF, from United States District Court for the District of Delaware, pp. 1-133, Aug. 14, 2009.
Exhibit PP, in *Arendi Holding Ltd. v. Microsoft Corp*, CA No. 09-119-JJF, from United States District Court for the District of Delaware, pp. 1-22, Aug. 14, 2009.
Exhibit Q, in *Arendi Holding Ltd. v. Microsoft Corp*, CA No. 09-119-JJF, from United States District Court for the District of Delaware, pp. 1-40, Aug. 14, 2009.
Exhibit QQ, in *Arendi Holding Ltd. v. Microsoft Corp*, CA No. 09-119-JJF, from United States District Court for the District of Delaware, pp. 1-52, Aug. 14, 2009.
Exhibit R, in *Arendi Holding Ltd. v. Microsoft Corp*, CA No. 09-119-JJF, from United States District Court for the District of Delaware, pp. 1-44, Aug. 14, 2009.
Exhibit RR, in *Arendi Holding Ltd. v. Microsoft Corp*, CA No. 09-119-JJF, from United States District Court for the District of Delaware, pp. 1-32, Aug. 14, 2009.
Exhibit S, in *Arendi Holding Ltd. v. Microsoft Corp*, CA No. 09-119-JJF, from United States District Court for the District of Delaware, pp. 1-51, Aug. 14, 2009.
Exhibit SS, in *Arendi Holding Ltd. v. Microsoft Corp*, CA No. 09-119-JJF, from United States District Court for the District of Delaware, pp. 1-34, Aug. 14, 2009.
Exhibit T, in *Arendi Holding Ltd. v. Microsoft Corp*, CA No. 09-119-JJF, from United States District Court for the District of Delaware, pp. 1-34, Aug. 14, 2009.
Exhibit TT, in *Arendi Holding Ltd. v. Microsoft Corp*, CA No. 09-119-JJF, from United States District Court for the District of Delaware, pp. 1-32, Aug. 14, 2009.
Exhibit U, in *Arendi Holding Ltd. v. Microsoft Corp*, CA No. 09-119-JJF, from United States District Court for the District of Delaware, pp. 1-34, Aug. 14, 2009.
Exhibit UU, in *Arendi Holding Ltd. v. Microsoft Corp*, CA No. 09-119-JJF, from United States District Court for the District of Delaware, pp. 1-32, Aug. 14, 2009.
Exhibit V, in *Arendi Holding Ltd. v. Microsoft Corp*, CA No. 09-119-JJF, from United States District Court for the District of Delaware, pp. 1-34, Aug. 14, 2009.
Exhibit VV, in *Arendi Holding Ltd. v. Microsoft Corp*, CA No. 09-119-JJF, from United States District Court for the District of Delaware, pp. 1-33, Aug. 14, 2009.
Exhibit W, in *Arendi Holding Ltd. v. Microsoft Corp*, CA No. 09-119-JJF, from United States District Court for the District of Delaware, pp. 1-35, Aug. 14, 2009.
Exhibit WW, in *Arendi Holding Ltd. v. Microsoft Corp*, CA No. 09-119-JJF, from United States District Court for the District of Delaware, pp. 1-32, Aug. 14, 2009.
Exhibit X, in *Arendi Holding Ltd. v. Microsoft Corp*, CA No. 09-119-JJF, from United States District Court for the District of Delaware, pp. 1-7, Aug. 14, 2009.
Exhibit XX, in *Arendi Holding Ltd. v. Microsoft Corp*, CA No. 09-119-JJF, from United States District Court for the District of Delaware, pp. 1-31, Aug. 14, 2009.
Exhibit Y, in *Arendi Holding Ltd. v. Microsoft Corp*, CA No. 09-119-JJF, from United States District Court for the District of Delaware, pp. 1-34, Aug. 14, 2009.
Exhibit YY, in *Arendi Holding Ltd. v. Microsoft Corp*, CA No. 09-119-JJF, from United States District Court for the District of Delaware, pp. 1-31, Aug. 14, 2009.
Exhibit Z, in *Arendi Holding Ltd. v. Microsoft Corp*, CA No. 09-119-JJF, from United States District Court for the District of Delaware, pp. 1-34, Aug. 14, 2009.
Exhibit ZZ, in *Arendi Holding Ltd. v. Microsoft Corp*, CA No. 09-119-JJF, from United States District Court for the District of Delaware, pp. 1-32, Aug. 14, 2009.
Defendants Microsoft Corp. and Dell, Inc.'s Brief in Support of their Motion for Summary Judgment of Invalidity for Failure to Comply with 35 U.S.C. § 112, in *Arendi Holding Ltd. v. Microsoft Corp*, CA No. 09-119-JJF, from United States District Court for the District of Delaware, pp. 1-23, Aug. 10, 2009.
Declaration of W. Bruce Croft, Ph.D., in *Arendi Holding Ltd. v. Microsoft Corp*, CA No. 09-119-JJF, from United States District Court for the District of Delaware, pp. 1-15, Aug. 10, 2009.
Plaintiff's Opening Brief in Support of Its Proposed Claim Constructions, in *Arendi Holding Ltd. v. Microsoft Corp*, CA No. 09-119-JJF, from United States District Court for the District of Delaware, pp. 1-36, Aug. 10, 2009.
Microsoft Corp. and Dell Inc.'s Claim Construction Brief, in *Arendi Holding Ltd. v. Microsoft Corp*, CA No. 09-119-JJF, from United States District Court for the District of Delaware, pp. 1-28, Aug. 10, 2009.
Plaintiff's Counter-Statement of Disputed Material Facts in Opposition to Defendants' Motion for Summary Judgment of Invalidity, in *Arendi Holding Ltd. v. Microsoft Corp*, CA No. 09-119-JJF, from United States District Court for the District of Delaware, pp. 1-19, Aug. 24, 2009.
Plaintiff's Answering Brief in Support of its Proposed Claim Constructions, in *Arendi Holding Ltd. v. Microsoft Corp*, CA No. 09-119-JJF, from United States District Court for the District of Delaware, pp. 1-43, Aug. 25, 2009.
Microsoft Corp. and Dell, Inc.'s Answering Claim Construction Brief, in *Arendi Holding Ltd. v. Microsoft Corp*, CA No. 09-119-JJF, from United States District Court for the District of Delaware, pp. 1-25, Aug. 25, 2009.
Microsoft Corp. and Dell, Inc.'s Response to Plaintiff's Counter-Statement to Defendants' Motion for Summary Judgment of Invalidity, in *Arendi Holding Ltd.* v. *Microsoft Corp*, CA No. 09-119-JJF, from United States District Court for the District of Delaware, pp. 1-22, Aug. 31, 2009.

Microsoft Corp. and Dell, Inc.'s First Amended Answer, Affirmative Defenses and Counterclaims to Complaint, in *Arendi Holding Ltd.* v. *Microsoft Corp*, CA No. 09-119-JJF, from United States District Court for the District of Delaware, pp. 1-34, Oct. 19, 2009.

Plaintiff's Answer to Defendants' First Amended Counterclaims, in *Arendi Holding Ltd.* v. *Microsoft Corp*, CA No. 09-119-JJF, from United States District Court for the District of Delaware, pp. 1-19, Oct. 30, 2009.

Microsoft Corp. and Dell, Inc.'s Second Amended Answer, Affirmative Defenses and Counterclaims to Complaint, in *Arendi Holding Ltd.* v. *Microsoft Corp*, CA No. 09-119-JJF, from United States District Court for the District of Delaware, pp. 1-34, Dec. 8, 2009.

Opposition for European Patent No. EP-B- 1171836, in the European Patent Office, pp. 1-32, Jul. 26, 2006.

In Response to Notice of Opposition for European Patent No. EP-B-1171836, in the European Patent Office, pp. 1-21, Mar. 7, 2007.

Decision Revoking European Patent No. EP-B- 1171836, European Patent Office, pp. 1-13, Jul. 9, 2009.

Notice of Appeal for European Patent No. EP-B- 1171836, in the European Patent Office, pp. 1-2, Sep. 1, 2009.

Grounds of Appeal for European Patent No. EP-B- 1171836, in the European Patent Office, pp. 1-62, Nov. 19, 2009.

Plaintiff's Answer to Microsoft Corporation's and Dell Inc.'s Second Amended Counterclaims, in *Arendi Holding Ltd.* v. *Microsoft Corp. and Dell Inc.*, CA No. 09-119-JJF-LPS, from United States District Court for the District of Delaware, pp. 1-20, Dec. 14, 2009.

Submission of opponent (Microsoft) in opposition against European Patent No. 1 171 836, Appeal T1779/09-3501, in the European Patent Office, 5 pages, Mar. 25, 2010.

Second Affidavit of David Block, 15 pages, May 15, 2009.

Second Affidavit of James Miller, 36 pages, May 15, 2009.

Hall, Wendy, et al., "Rethinking Hypermedia," Kluwer Academic Publishers, 87 pages, 1996.

Deposition of David Block, *Arendi U.S.A., Inc.* v. *Microsoft Corp.*, Case No. 02-CV-343 (ECT), from United States District Court for the Northern District of California, 196 pages, Aug. 13, 2004.

Exhibits for the Deposition of David Block, *Arendi U.S.A., Inc.* v. *Microsoft Corp.*, Case No. 02-CV-343 (ECT), from United States District Court for the Northern District of California, 334 pages, Aug. 13, 2004.

Writ of Summons to Arendi Holding Co., District Court in the Hague and English translation, 65 pages, Oct. 26, 2005.

Microsoft's Reply in the Main Action, Defense in the Counterclaim, District Court in the Hague, No. 2006/0782, 55 pages, date unknown.

Microsoft's Reply in the Main Action, Defense in the Counterclaim, District Court in the Hague, No. 2006/0782, English Translation, 51 pages, date unknown.

Microsoft's Reply in Counterclaim for Infringement, District Court in the Hague, No. 2006/0782, 26 pages, Sep. 24, 2008.

Microsoft's Reply in Counterclaim for Infringement, District Court in the Hague, No. 2006/0782, English Translation, 23 pages, Sep. 24, 2008.

Statement of Defense in the Principal Action and With Regard to the Interlocutory Claim Also Comprising a Counterclaim, With Exhibit, District Court in the Hague, No. 2006/0782, 58 pages, Jan. 31, 2007.

Statement of Defense in the Principal Action and With Regard to the Interlocutory Claim Also Comprising a Counterclaim, District Court in the Hague, No. 2006/0782, English Translation, 23 pages, Jan. 31, 2007.

Statement of Rejoinder in the Principal Action (Incl. With Regard to the Interlocutory Claims) Also Comprising Statement of Reply in the Counterclaim With Exhibits, District Court in the Hague, No. 2006/0782, 126 pages, Mar. 12, 2008.

Statement of Rejoinder in the Principal Action (Incl. With Regard to the Interlocutory Claims) Also Comprising Statement of Reply in the Counterclaim, District Court in the Hague, No. 2006/0782, English Translation, 33 pages, Mar. 12, 2008.

Letter from Abraham H. Spierer to David Block, Dec. 19, 1994.

Claris Em@iler User's Manual, 187 pages, © 1995-1997.

"Word Lookup Data Detectors," Dictionary.com, available at http://dictionary.reference.com/mac/add.html, 3 pages, © 2004.

Apple.com internet web pages (*marked "MS 118139-MS 118143"*), 5 pages, © 2001.

"Overview: What are Apple Data Detectors", Apple.com internet web pages (*marked "MA 118078-MS 118092"*), 15 pages, © 2002.

Addressmate Plus User Manual Addendum, 2 pages, Nov. 1, 1995.

Now Software, Inc., "Now Contact & Up•to•Date Quick Reference Guide", 18 pages, © 1992-95.

Now Software, Inc., "Now Contact version 3.5 User's Guide", 204 pages, © 1992-95.

Now Software, Inc., "Now Up•to•Date version 3.5 User's Guide", 210 pages, © 1992-95.

Now Software, Inc., "Now Utilities Quick Reference Guide", 6 pages, no date available.

Now Software, Inc., "What's New in Now Up•to•Date & Now Contact", 14 pages, © 1995.

Reply Brief of Plaintiffs-Appellants Arendi USA, Inc. and Arendi Holding Limited, United States Court of Appeals for the Federal Circuit, 37 pages, Sep. 2, 2005.

Apple Data Detectors/Internet Address Detectors, ADD-IAD_1.0. 2_Info.txt, 1 page, Mar. 5, 1998.

Cortinas, M., Data Ratchet extracts info, ZD.com, 2 pages, Apr. 3, 1997.

Glucose Unveils Data Ratchet v.1.1!, Glucose Development Corp., 5 pages, 1997.

Glucose Releases Data Ratchet Source, Glucose Press Release, 1 page, Dec. 18, 1999.

Are you a document mechanic?, from Glucose Development Corp.'s webpage (http://glulabs.com), 2 pages, 2002.

Glucose Open Source Tools, from Glucose Development Corp., 2 pages, 1999.

E-Mail 'Net Differences—Eudora Pro and E-Mail Connection shine in their own ways . . . , Communications Week, 4 pages, Jan. 6, 1997.

Internet Update Sep. 10, 1997, Newsbytes news Network, 5 pages, Sep. 10, 1997.

Brouwer, Rene, ADD→Address Book, 1 page, Jun. 8, 1998.

Byrne, Mike, ADD→New Mail, 1 page, Aug. 23, 1998.

MacCentral: Apple Macintosh News, 4 pages, Jan. 12-13, 2004.

Turney, P., Learning to Extract Key Phrases from Text, National Research Council of Canada, 46 pages, Feb. 1999.

Deposition of Atle Hedloy in *Arendi Holding Ltd.* v. *Microsoft Corp*, CA No. 09-119-JJF, from United States District Court for the District of Delaware, pp. 162-213, Mar. 7, 2010.

Deposition of David Block in *Arendi Holding Ltd.* v. *Microsoft Corp*, CA No. 09-119-JJF, from United States District Court for the District of Delaware, pp. 1-4, 31-52, 56-57, 67, Apr. 9, 2010.

Exhibit 15, in Deposition of David Block in *Arendi Holding Ltd.* v. *Microsoft Corp*, CA No. 09-119-JJF from United States District Court for the District of Delaware , pp. 1-6, Apr. 9, 2010.

Exhibit 16, in Deposition of David Block in *Arendi Holding Ltd.* v. *Microsoft Corp*, CA No. 09-119-JJF, from United States District Court for the District of Delaware, pp. 1-2, Apr. 9, 2010.

Exhibit 17, in Deposition of David Block in *Arendi Holding Ltd.* v. *Microsoft Corp*, CA No. 09-119-JJF, from United States District Court for the District of Delaware, pp. 1-28, Apr. 9, 2010.

Exhibit 18, in Deposition of David Block in *Arendi Holding Ltd.* v. *Microsoft Corp*, CA No. 09-119-JJF, from United States District Court for the District of Delaware, pp. 1-23, Apr. 9, 2010.

Exhibit 19, in Deposition of David Block in *Arendi Holding Ltd.* v. *Microsoft Corp*, CA No. 09-119-JJF, from United States District Court for the District of Delaware, pp. 1-13, Apr. 9, 2010.

Deposition of James R. Miller in *Arendi Holding Ltd.* v. *Microsoft Corp*, CA No. 09-119-JJF, from United States District Court for the District of Delaware, pp. 1-4, 72-115, Apr. 9, 2010.

Exhibit 11, in Deposition of James R. Miller in *Arendi Holding Ltd.* v. *Microsoft Corp*, CA No. 09-119-JJF, from United States District Court for the District of Delaware, pp. 1-7, Apr. 9, 2010.

Exhibit 12, in Deposition of James R. Miller in *Arendi Holding Ltd.* v. *Microsoft Corp*, CA No. 09-119-JJF, from United States District Court for the District of Delaware, pp. 1-2, Apr. 9, 2010.

Exhibit 13, in Deposition of James R. Miller in *Arendi Holding Ltd. v. Microsoft Corp*, CA No. 09-119-JJF, from United States District Court for the District of Delaware, pp. 1-28, Apr. 9, 2010.
Exhibit 14, in Deposition of James R. Miller in *Arendi Holding Ltd. v. Microsoft Corp*, CA No. 09-119-JJF, from United States District Court for the District of Delaware, pp. 1-18, Apr. 9, 2010.
Exhibit 15, Deposition of James R. Miller in *Arendi Holding Ltd. v. Microsoft Corp*, CA No. 09-119-JJF, from United States District Court for the District of Delaware, pp. 1-36, Apr. 9, 2010.
Expert Report of Bruce Croft, in *Arendi Holding Ltd. v. Microsoft Corp*, CA No. 09-119-JJF, from United States District Court for the District of Delaware, pp. 1-166, Apr. 30, 2010.
Exhibit A, in Expert Report of Bruce Croft, in *Arendi Holding Ltd. v. Microsoft Corp*, CA No. 09-119-JJF, from United States District Court for the District of Delaware, pp. 1-30, Apr. 30, 2010.
Exhibit B, in Expert Report of Bruce Croft, in *Arendi Holding Ltd. v. Microsoft Corp*, CA No. 09-119-JJF, from United States District Court for the District of Delaware, pp. 1-15, Apr. 30, 2010.
Exhibit C, Expert Report of Bruce Croft ,in *Arendi Holding Ltd. v. Microsoft Corp*, CA No. 09-119-JJF, from United States District Court for the District of Delaware, pp. 1-90, Apr. 30, 2010.
Michael Bieber, "On Automating Hypertext Links in Knowledge-Based Decision Support Systems", Technical Report BCCS-90-08, pp. 1-22, Apr. 1990.
N. Streitz, A. Rizk and J. André, Hypertext: Concepts, Systems and Applications: Proceedings of the First European Conference on Hypertext, INRIA, France, pp. 1-8, Nov. 1990.
Michael Bieber, "Issues in Modeling A "Dynamic" Hypertext Interface", Technical Report BCCS-91-2, pp. 1-13, Apr. 1991.
Michael Bieber and Tomás Isakowitz, "Valuation Links: Extending the Computational Power of Hypertext", Technical Report BCCS-91-1, pp. 1-11, Apr. 1991.
Michael Bieber, Template-Driven Hypertext: A Methodology for Integrating a Hypertext Interface into Information Systems, Technical Report BCCS-91-3, pp. 1-23, Jun. 1991.
Michael Bieber and Steven O. Kimbrough, "On Generalizing the Concept of Hypertext", Technical report BCCS-91-5, pp. 1-11, Jun. 1991.
Michael Bieber and Tomás Isakowitz, "Bridge Laws in Hypertext A Logic Modeling Approach", Technical Report BCCS-91-4, pp. 1-30, Jun. 1991.
Michael Bieber, "On Merging Hypertext Into Dynamic, Non-Hypertext Systems", Technical Report BCCS-91-14, pp. 1-24, Nov. 8, 1991.
Mark Bernstein, Jay David Bolter, Michael Joyce and Elli Mylonas, "Architectures for Volatile Hypertext", Hypertext '91 Proceedings, pp. 243-280, Dec. 1991.
Michael Bieber, "Providing Information Systems With Full Hypermedia Functionality", pp. 1-15, Oct. 1992.
Mail Address Change Notification, IBM Technical Disclosure Bulletin, vol. 36 No. 1, pp. 70-72, Jan. 1993.
D.D. Cowan, C.J.P. Lucena and R.G. Veitch, Towards CAAI: Computer Assisted Application Integration, Technical Report Series CS-93-17, University of Waterloo, pp. 1-23, Oct. 1993.
Herman Kaind and Stefan Kramer, Semiautomatic Generation of Dictionary Links in Hypertext, pp. 1-14, Feb. 1, 1995.
Michael Bieber, "On Integrating Hypermedia into Decision Support and Other Information Systems", Decision Support Systems 14, pp. 251-267, 1995.
Proceedings, Sixth Message Understanding Conference (MUC-6), pp. 1-64, Nov. 6-8, 1995.
Sargur N. Srihari, et al, "A System to Read Names and Addresses on Tax Forms", Proceedings of the IEEE, vol. 84, No's, Jul. 1996.
Ph. Bonnet and S. Bressan, "Extraction and Integration of Data from Semi-structured Documents into Business Applications", Sloan WP#3979, CISL WP# 97-12, pp. 1-9, Sep. 1997.
Borland, Russel, "Advance Self-Study Step by Step Microsoft Word 97 Advance Topics", Microsoft Press, 331 pages, 1997.
Microsoft Word Language Reference, Official Technical Reference to Visual Basic for Applications, Microsoft Press, 1133 pages, © 1997.

Microsoft PowerPoint and Microsoft Outlook Language References, Official Technical Reference to Visual Basic for Applications, Microsoft Press, vol. 4, 539 pages, 1997.
Microsoft Visual Basic for Applications and Shared Libraries References, vol. 5 of 5, Microsoft Press, 1005 pages, part No. 097-001685, © 1997.
Microsoft Office 97 Resource Kit, Technical Information and Tools for the Support Professional, Microsoft Press, 1162 pages, © 1997.
Microsoft Office 97 Reviewer's Guide, Professional Edition, 546 pages, Aug. 1996.
Running Microsoft Word for Windows 95, in Depth Reference and Inside Tips from the Software Experts, Russell Borland, Microsoft Press, 1040 pages, © 1995.
Running Microsoft Office 97, Standard and Professional, Michael Halvorson and Michael Young, Microsoft Press, 1130 pages, © 1997.
Microsoft Word 97, self-Study Kit, Covers Microsoft Word 97 for Windows 95 and Windows NT version 4.0, Microsoft Press, 314 pages, © 1997.
Microsoft Outlook 97, Step by Step, Self-Study Kit, Microsoft Press, 359 pages, © 1997.
VBA Developer's Handbook, Reusable Code, Visio Professional Demo Copy, and VB5CCE, 1997.
Microsoft97/Visual Basic Programmer's Guide, Microsoft Press, 548 pages, © 1997.
Microsoft Access Language Reference and Office Data Access Reference, Official Technical Reference to Visual Basic for Applications, Microsoft Press, 1287 pages, © 1997.
Microsoft Office97 Step by Step, Visual Basic, Developer's Self-Study Guide, Microsoft Press, 359 pages, © 1997.
Microsoft Office97 Developer's Handbook, Microsoft Press, Christine Solomon, 596 pages, © 1997.
Microsoft Word Developer's Kit, Microsoft Professional Editions, Third Edition, Manufacturing Copy $1_{st}$, Microsoft Press, 1106 pages, © 1995.
Inside Microsoft Word, vol. 4, No. 1, The Cobb Group, pp. 1-16, Jan. 1997.
Inside Microsoft Word, vol. 4, No. 2, The Cobb Group, pp. 1-16, Feb. 1997.
Inside Microsoft Word, vol. 4, No. 3, The Cobb Group, pp. 1-16, Mar. 1997.
Inside Microsoft Word, vol. 4, No. 4, The Cobb Group, pp. 1-16, Apr. 1997.
Inside Microsoft Word, vol. 4, No. 7, The Cobb Group, pp. 1-16, Jul. 1997.
Inside Microsoft Word, vol. 5, No. 9, ZD Journals, pp. 1-16, Sep. 1998.
Inside Microsoft Word, vol. 5, No. 10, ZD Journals, pp. 1-16, Oct. 1998.
Inside Microsoft Word, vol. 5, No. 11, ZD Journals, pp. 1-16, Nov. 1998.
Eudora Mail Pro, Version 3.0 for Windows, User Manual, QUALCOMM Incorporated, 198 pages, Jun. 1997.
Eudora Mail Pro, Version 3.1 for Macintosh, User Manual, QUALCOMM Incorporated, 199 pages, Jun. 1997.
Non-Confidential Redacted Jun. 11, 2010 Rebuttal Expert Report Richard Taylor, 311 pages.
Spell Checking for Microsoft Windows, Palantir Software, 36 pages, © 1986.
Johannes, S., et al., "Active Messenger: Email Filtering and Mobile Delivery," *Massachusetts Institute of Technology*, pp. 1-122, Sep. 1999.
Srihari, S, et al., "A System to Read Names and Addresses on Tax Forms," *Proceedings of the IEEE*, vol. 14, No. 7, pp. 1038-1049, Jul. 1996.
US Patent No. 6,323,853, U.S. Appl. No. 09/189,626 As Filed, 58 pages, Nov. 10, 1998.*
US Patent No. 6,323,853, Preliminary Amendment, U.S. Appl. No. 09/189,626, 20 pages, Apr. 29, 1999.*
US Patent No. 6,323,853, Office Action, U.S. Appl. No. 09/189,626, 9 pages, Apr. 26, 2000.*
US Patent No. 6,323,853, U.S. Appl. No. 09/189,626, Interview Summary, 2 pages, Jun. 14, 2000.*

US Patent No. 6,323,853, Response, U.S. Appl. No. 09/189,626, 5 pages, Jul. 25, 2000.*
US Patent No. 6,323,853, Final Office Action, U.S. Appl. No. 09/189,626, 10 pages, Sep. 18, 2000.*
US Patent No. 6,323,853, Interview Summary, U.S. Appl. No. 09/189,626, 1 page, Oct. 17, 2000.*
US Patent No. 6,323,853, Response, U.S. Appl. No. 09/189,626, 5 pages, Dec. 18, 2000.*
US Patent No. 6,323,853, Notice of Allowance, U.S. Appl. No. 09/189,626, 7 pages, Jan. 4, 2001.*
US Patent No. 6,323,853, Notice of Allowance, U.S. Appl. No. 09/189,626, 2 pages, Oct. 2, 2001.*
US Patent No. 7,496,854, Application As Filed, 100 pages, Aug. 6, 2001.*
US Patent No. 7,496,854, Preliminary Amendment, U.S. Appl. No. 09/923,134, 7 pages, Dec. 17, 2001.*
US Patent No. 7,496,854, Office Action, U.S. Appl. No. 09/923,134, 10 pages, Oct. 15, 2002.
US Patent No. 7,496,854, Response, 4 pages, U.S. Appl. No. 09/923,134, Apr. 15, 2003.
US Patent No. 7,496,854, Final Office Action, U.S. Appl. No. 09/923,134, 7 pages, Jun. 27, 2003.
US Patent No. 7,496,854, Response, U.S. Appl. No. 09/923,134, 6 pages, Aug. 21, 2003.
US Patent No. 7,496,854, Office Action, U.S. Appl. No. 09/923,134, 4 pages, Nov. 19, 2003.
US Patent No. 7,496,854, Response, U.S. Appl. No. 09/923,134, 5 pages, Feb. 10, 2004.
US Patent No. 7,496,854, Notice of Allowance, U.S. Appl. No. 09/923,134, 4 pages, May 19, 2004.
US Patent No. 7,496,854, Response, U.S. Appl. No. 09/923,134, 14 pages, Dec. 30, 2004.
US Patent No. 7,496,854, Office Action, U.S. Appl. No. 09/923,134, 7 pages, Aug. 29, 2005.
US Patent No. 7,496,854, Response, U.S. Appl. No. 09/923,134, 17 pages, Nov. 16, 2005.
US Patent No. 7,496,854, Final Office Action, U.S. Appl. No. 09/923,134, 10 pages, Feb. 6, 2006.
US Patent No. 7,496,854, Response, U.S. Appl. No. 09/923,134, 22 pages, Aug. 4, 2006.
US Patent No. 7,496,854, Office Action, U.S. Appl. No. 09/923,134, 8 pages, Oct. 18, 2006.
US Patent No. 7,496,854, Interview Summary, U.S. Appl. No. 09/923,134, 3 pages, Jan. 23, 2007.
US Patent No. 7,496,854, Response, U.S. Appl. No. 09/923,134, 32 pages, Apr. 18, 2007.
US Patent No. 7,496,854, Notice of Allowance, U.S. Appl. No. 09/923,134, 8 pages, Jul. 13, 2007.
US Patent No. 7,496,854, Interview Summary, U.S. Appl. No. 09/923,134, 4 pages, Oct. 19, 2007.
US Patent No. 7,496,854, Office Action, U.S. Appl. No. 09/923,134, 9 pages, Nov. 9, 2007.
US Patent No. 7,496,854, Response, U.S. Appl. No. 09/923,134, 32 pages, Jan. 24, 2008.
US Patent No. 7,496,854, Notice of Allowance, U.S. Appl. No. 09/923,134, 7 pages, Jul. 2, 2008.
US Patent No. 7,496,854, Amendment Under Rule 312; U.S. Appl. No. 09/923,134, 27 pages, Jul. 8, 2008.
US Patent No. 7,496,854, Response to Amendment Under Rule 312, U.S. Appl. No. 09/923,134, 4 pages, Jan. 21, 2009.
U.S. Appl. No. 12/841,302, Application As Filed, 47 pages, Jul. 22, 2010.
U.S. Appl. No. 12/841,302, Accelerated Examination Support Document, 150 pages, Jul. 29, 2010.
U.S. Appl. No. 12/841,302, Office Action, 22 pages, Nov. 24, 2010.
U.S. Appl. No. 12/841,302, Response, 18 pages, Dec. 14, 2010.
US Patent No. 7,272,604, U.S. Appl. No. 09/390,303 As Filed, 55 pages, Sep. 3, 1999.
US Patent No. 7,272,604, Office Action, U.S. Appl. No. 09/390,303, 9 pages, May 8, 2002.
US Patent No. 7,272,604, Response, U.S. Appl. No. 09/390,303, 7 pages, Aug. 8, 2002.
US Patent No. 7,272,604, Office Action, U.S. Appl. No. 09/390,303, 11 pages, Sep. 27, 2002.
US Patent No. 7,272,604, Proposed Response, U.S. Appl. No. 09/390,303, 4 pages, Oct. 24, 2002.
US Patent No. 7,272,604, Response, U.S. Appl. No. 09/390,303, 3 pages, Mar. 27, 2003.
US Patent No. 7,272,604, Final Office Action, U.S. Appl. No. 09/390,303, 9 pages, Apr. 21, 2003.
US Patent No. 7,272,604, Response, U.S. Appl. No. 09/390,303, 16 pages, Oct. 21, 2003.
US Patent No. 7,272,604, Notice of Allowance, U.S. Appl. No. 09/390,303, 7 pages, Nov. 17, 2003.
US Patent No. 7,272,604, Notice of Allowance, U.S. Appl. No. 09/390,303, 6 pages, Apr. 6, 2004.
US Patent No. 7,272,604, Supplemental Notice of Allowance, U.S. Appl. No. 09/390,303, 2 pages, Mar. 7, 2006.
US Patent No. 7,272,604, Office Action, U.S. Appl. No. 09/390,303, 10 pages, Jun. 6, 2006.
US Patent No. 7,272,604, Response, U.S. Appl. No. 09/390,303, 19 pages, Dec. 5, 2006.
US Patent No. 7,272,604, Notice of Allowance, U.S. Appl. No. 09/390,303, 7 pages, Feb. 7, 2007.
U.S. Appl. No. 11/745,186, Application As Filed, 61 pages, May 7, 2007.
U.S. Appl. No. 11/745,186, Office Action, 8 pages, Mar. 6, 2008.
U.S. Appl. No. 11/745,186, Response, 18 pages, May 14, 2008.
U.S. Appl. No. 11/745,186, Office Action, 17 pages, Oct. 14, 2008.
U.S. Appl. No. 11/745,186, Response, 28 pages, Feb. 13, 2009.
U.S. Appl. No. 11/745,186, Final Office Action, 16 pages, Mar. 26, 2009.
U.S. Appl. No. 11/745,186, Interview Summary, 4 pages, May 7, 2009.
U.S. Appl. No. 11/745,186, Response, 22 pages, Jun. 2, 2009.
U.S. Appl. No. 11/745,186, Advisory Action, 3 pages, Jun. 16, 2009.
U.S. Appl. No. 11/745,186, Request for Continued Examination, 3 pages, Jun. 22, 2009.
U.S. Appl. No. 11/745,186, Office Action, 40 pages, Sep. 29, 2009.
U.S. Appl. No. 11/745,186, Interview Summary, 3 pages, Mar. 26, 2010.
U.S. Appl. No. 11/745,186, Response, 29 pages, Mar. 29, 2010.
U.S. Appl. No. 11/745,186, Final Office Action, 10 pages, Jun. 15, 2010.
U.S. Appl. No. 11/745,186, Interview Summary, 3 pages, Aug. 5, 2010.
U.S. Appl. No. 11/745,186, Response, 24 pages, Aug. 10, 2010.
U.S. Appl. No. 11/745,186, Advisory Action, 3 pages, Aug. 16, 2010.
U.S. Appl. No. 11/745,186, Response, 18 pages, Sep. 23, 2010.
U.S. Appl. No. 11/745,186, Interview Summary, 3 pages, Dec. 14, 2010.
U.S. Appl. No. 12/963,744, Application As Filed, 53 pages, Dec. 9, 2010.
U.S. Appl. No. 12/963,744, Accelerated Examination Support Document, 80 pages, Dec. 9, 2010.
U.S. Appl. No. 12/841,302, Interview Summary, 3 pages, Dec. 20, 2010.

* cited by examiner

FIG. 7

Arendi OneButton Contact Register

Name

- Title:
- First: John
- Middle:
- Last: Smith
- Suffix:
- Company:

- Address type: Home — 54
- Street: 222 5th Ave.
- City: New York
- State/Province: NY
- ZIP/Postal: 10028
- Country:

64 — Add and Choose

66 — Options...

60 — Cancel

Dette er en test

METHOD, SYSTEM AND COMPUTER READABLE MEDIUM FOR ADDRESSING HANDLING FROM A COMPUTER PROGRAM

CROSS REFERENCES TO RELATED APPLICATIONS

The present application is a continuation of U.S. application Ser. No. 09/923,134 filed on Aug. 6, 2001, which in turn is a continuation of U.S. application Ser. No. 09/189,626 filed on Nov. 10, 1998, and which issued as U.S. Pat. No. 6,323,853. Each of the above-described applications is hereby incorporated by reference in their entireties.

BACKGROUND OF THE INVENTION

1. Field of the Invention

This invention relates to a method, system and computer readable medium for name and address handling (hereinafter called "address handling"), and more particularly to a touch screen, keyboard button, icon, menu, voice command device, etc. (hereinafter called "button") provided in a computer program, such as word processing program, spreadsheet program, etc., and coupled to an information management source for providing address handling within a document created by the computer program.

2. Discussion of the Background

In recent years, with the advent of programs, such as word processors, spreadsheets, etc. (hereinafter called "word processors") users may require retrieval of information, such as name and address information, etc., for insertion into a document, such a letter, fax, etc., created with the word processor. Typically, the information is retrieved by the user from an information management source external to the word processor, such as a database program, contact management program, etc., or from the word processor itself, for insertion into the document. Examples of such word processors are WORD™, NOTEPAD™, EXCEL™, WORDPAD™, WORDPERFECT™, QUATROPRO™, AMIPRO™, etc., and examples of such information management sources are ACCESS™, OUTLOOK™, ORACLE™, DBASE™, RBASE™, CARDFILE™, etc.

However, the information in the database must constantly be updated by the user. This requires the user to learn how to use and have access to the database. In this case, a change in the information, such as change in address or a name, etc., requires the user of the word processor to implement this change in the database, or alternatively, the change is made to the database centrally by a database administrator.

SUMMARY OF THE INVENTION

Accordingly, an object of the present invention is to provide a method, system and computer readable medium for address handling within a computer program.

Another object of the present invention is to provide a method, system and computer readable medium for address handling within a computer program, such as a word processing program, spreadsheet program, etc.

Another object of the present invention is to provide a method, system and computer readable medium for address handling within a computer program, such as a word processing program, spreadsheet program, etc., using an input device provided in the computer program.

Another object of the present invention is to provide a method, system and computer readable medium for address handling within a computer program, such as a word processing program, spreadsheet program, etc., using an input device, such as a touch screen, keyboard button, icon, menu, voice command device, etc., provided in the computer program and coupled to an information management source.

Another object of the present invention is to provide a method, system and computer readable medium for address handling within a computer program, such as a word processing program, spreadsheet program, etc., using an input device such as a touch screen, keyboard button icon, menu, voice command device, etc., provided in the computer program and coupled to an information management source, such as a database program, contact management program, etc.

The above and other objects are achieved according to the present invention by providing a novel method, system and computer readable medium for providing a function item, such as a key, button, icon, or menu, tied to a user operation in a computer, whereby a single click on the function item in a window or program on a computer screen, or one single selection in a menu in a program, initiates retrieval of name and addresses and/or other person or company related information, while the user works simultaneously in another program, e.g., a word processor. The click on the function item initiates a program connected to the button to search a database or file available on or through the computer, containing the person, company or address related data, in order to look up data corresponding to what the user types, or partly typed, e.g., name and/or address in the word processor, the correct data from the database, data related to the typed data, e.g., the name of the person, company, or the traditional or electronic address, or other person, or company, or address related data, and alternatively the persons, companies, or addresses, are displayed and possibly entered into the word processor, if such related data exists.

The present invention also includes a computer readable medium storing program instructions by which the method of the invention can be performed when the stored program instructions are appropriately loaded into a computer, and a system for implementing the method of the invention.

BRIEF DESCRIPTION OF THE DRAWINGS

The invention description below refers to the accompanying drawings, of which:

FIG. 7 is a screen shot illustrating a contact register message window, according to an exemplary embodiment of the present invention;

FIG. 11 is a screen shot illustrating a more detailed mode of registering an additional address for the contact register of FIG. 9, according to an exemplary embodiment of the present invention;

FIG. 12 is a screen shot illustrating a contact management program window in a full detailed mode, according to an exemplary embodiment of the present invention;

DESCRIPTION OF THE PREFERRED EMBODIMENTS

In an embodiment of the present invention, single button addressing is a achieved by providing an input device, such as a touch screen, keyboard, icon, menu, voice command device, etc. (hereinafter called "button"), in a computer program, such as a word processing program, spreadsheet program, etc. (hereinafter called "word processor"), for executing address handling therein.

Accordingly, in a word processor, the button is added and a user types information, such as an addressee's name, or a part of the name, etc. in a document created with the word processor, such as a letter, fax, etc., and then clicks, selects, commands, etc. the button via the appropriate input device, such as a touch screen button, keyboard button, icon, menu choice, voice command device, etc. A program then executes and retrieves the typed information from the document, and searches an information management source, such as a database, file, database program, contact management program, etc. (hereinafter called "database") to determine if the information, such as the name or part of the name typed and searched by the program exists in the database. If the program does not find stored information, such as a name, corresponding to the name or part of the name typed, the user is asked by the program whether the information, such as the name that was not found, should be added to the database. In addition, the user may enter any other information besides the name, such as addresses, businesses, telephone numbers, fax numbers, e-mail address, etc., so that this other information can be stored in the database for later use.

If the program finds name(s) and address(es) corresponding to the part of the addressee's name typed, this additional information is automatically entered into the user's word processor, optionally with a confirmation from the user that this is the correct data. If the typed address information does not correspond to data already stored in the database, after clicking on the button, the program, for example, lets the user decide: (1) if this is new data (e.g., a new address) for an existing contact; (2) if the stored data should be changed to what the user just typed; (3) if this is a new contact with the same name as the one already entered into the database; or (4) if the typed address is only to be used once, and therefore not to be stored in the database at all. If, later, for example, a name with several address stored in the database is recalled all addresses for this contact will be displayed, so that the correct address can be selected by the user.

The program may be extended to also store and retrieve other information, such as telephone numbers, fax numbers, e-mail addresses, etc. Once the program recalls the telephone numbers, fax numbers, email addresses, etc., the user can command the program to send e-mails, faxes, etc. Similarly, if the user types in the name of a mailing list, the program create merge letters, group emails, etc.

Figure 1:
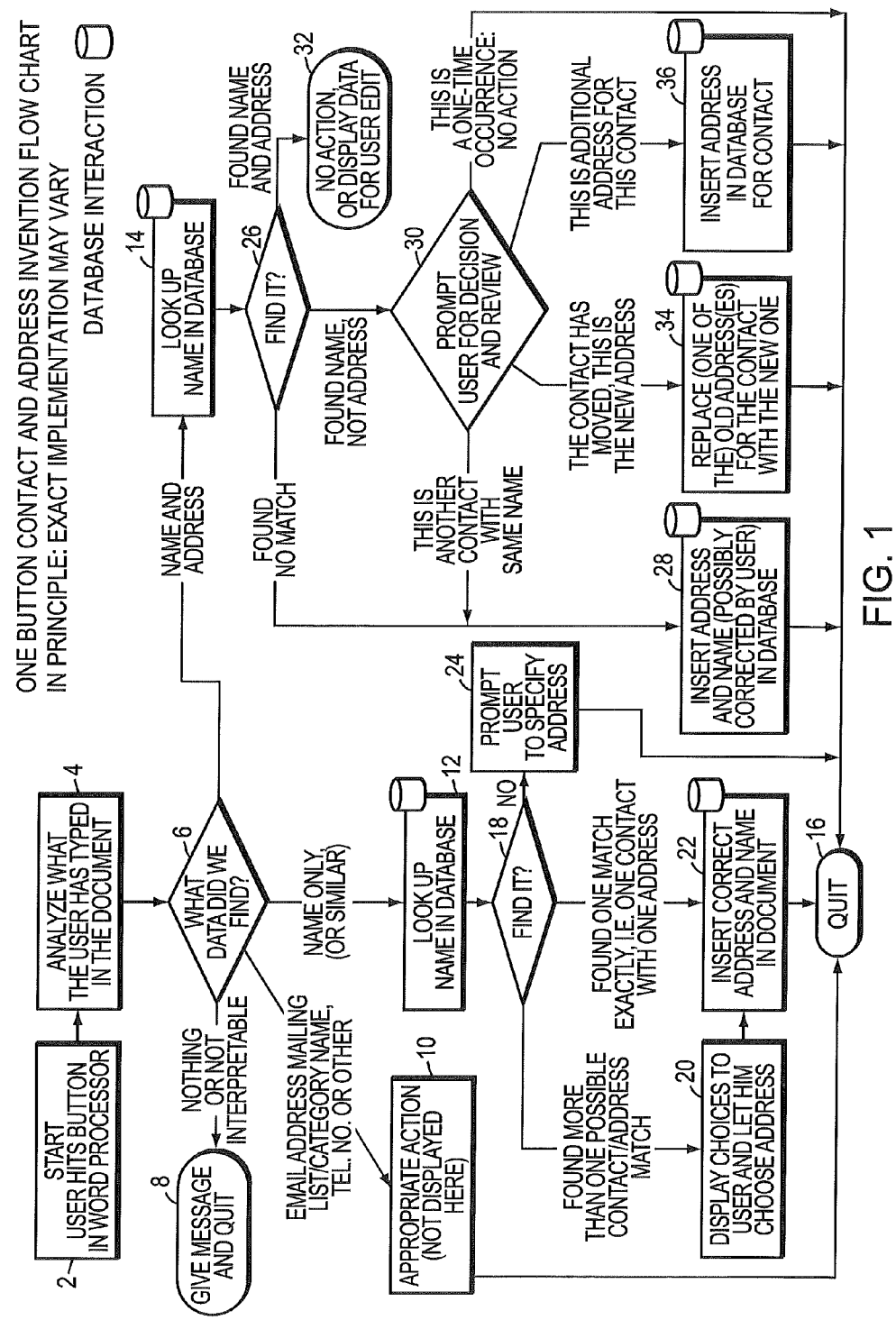
FIG. 1 is a flow chart illustrating a method for address handling within a computer program, according to an exemplary embodiment of the present invention.
Figure 2:
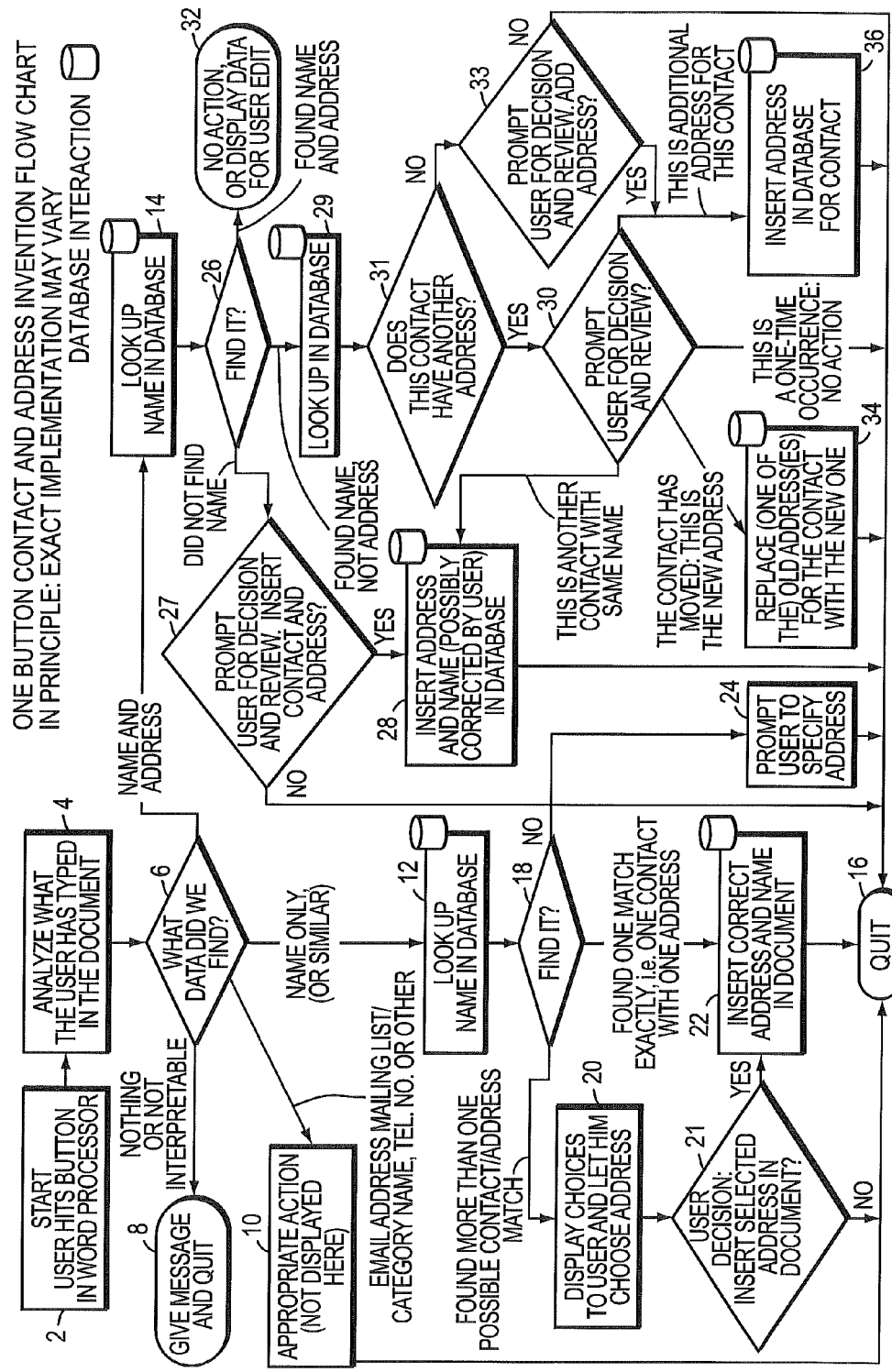
FIG. 2 is a flow chart illustrating a method for address handling within a computer program, according to another exemplary embodiment of the present invention.

Referring now to the drawings, wherein like reference numerals designate identical or corresponding parts throughout the several views, and more particularly to FIGS. 1 and 2 thereof, there is illustrated flow charts of single button addressing, according to exemplary embodiments of the present invention.

In FIG. 1, after the user has inserted the address in the word processor, the user commands the button at step 2 and the program analyzes what the user has typed in the document at step 4. At step 6, the program decides what was found in the document and if the program found nothing in the document or what it found was un-interpretable the program goes to step 8 and outputs an appropriate message to the user and then quits at step 16. The program analyzes what the user has typed in the document at step 4, for example, by analyzing (i) paragraph/line separations/formatting, etc.; (ii) street, avenue, drive, lane, boulevard, city, state, zip code, country designators and abbreviations, etc.; (iii) Mr., Mrs., Sir, Madam, Jr., Sr. designators and abbreviations, etc.; (iv) Inc., Ltd., P.C., L.L.C, designators and abbreviations, etc.; and (v) a database of common male/female names, etc.

If the program find an e-mail address mailing list/category name telephone number or other information, at step 10 an appropriate action is performed by the program and then the program execution quits at step 16. If the program only finds a name or initials, or the like, the program looks up the name in the database at step 12 and at step 18 the program determines what was found. If the program finds more than one possible contact/address match, at step 20 the program displays menu choices to the user to let him choose an appropriate answer. Then at step 22 the program inserts a correct address and name in the document and then at step 16 the program quits execution. If the program finds one match exactly, i.e., one contact with one address, the program inserts the correct address and name in the document at step 22 then quits and then quits execution at step 16. If the program does not find a name in the database, at step 24 the program prompts the user to specify an address and then quits execution at step 16. If the program at step 6 finds a name and an address, at step 14 the name is looked up in the database. Then, at step 26, if no match is found, at step 28 the program inserts an address and a name which are possibly corrected by the user into the database and then quits execution at step 16. If at step 26, the name and address is found, at step 32 the program either takes no action or displays the data for the user to edit. If at step 26, the name is found but not the address, the program prompts the user for a decision at step 30. If the user decides that this is another contact with a same name, the program goes to step 28. If the user decides that this is a one time occurrence, no action is taken and the program quits at step 16. If the user decides that the contact has, for example, moved and that this is a new address, at step 34 one of the old addresses for the contact is replaced with the new one and the program quits at step 16. If the user decides that this is an additional address for the contact, at step 36 the additional address is inserted into the database for that contact and execution quits at step 16.

The flowchart shown in FIG. 2 is similar to the flowchart in FIG. 1, except for some additional steps which will now be discussed. At step 6, if the program only finds a name or a similar name then the name is looked up in the database at step 12, then at step 18 if the program found more than one possible contact/address match, the program displays choices to the user to let him choose an address at step 20. Then at step 21 the user decides whether to insert the selected address into the document. If the user does not decide to select the address into the document the program quits execution at step 16. If the user decides to insert the selected address into the document the program inserts the address and name into the document at step 22 and then quits at step 16.

If the program finds a name and address in the database at step 6, then at step 14 the program looks up the name in the database and at step 26 the program determines what it has found. If the program does not find the name at step 26, at step 27 the program prompts the user for a decision and review and whether to insert the contact and address. If the user does not decide to insert the contact address, the program quits at step 16. If the user decides to insert the contact address, at step 28 the program inserts the address and name which may be possibly corrected by the user for program in the database then execution quits at step 16.

If at step 26 the program finds a name and not an address, then at step 29 the name is looked up in the database. Then at step 31 the program decides whether this contact has another address. If the contact does not have another address, at step 33 the program prompts the user for a decision and review and whether to add the address. If the user does not want to add the address at step 33, the program quits at step 16. If the user wants to add the address at step 33 because this is an additional address for the contact, at step 36 the address is inserted in the database for the contact and execution quits at step 16.

At step 30, if the user decides that this is another contact with the same name, then the program goes to step 28. If at step 30 the user decides that this is a one time occurrence, then the program quits at step 16. If at step 30, the user decides that the contact has, for example, moved, the program goes to step 34. If at step 30, the user decides that this is an additional address for the contact, at step 36 the program inserts the address in the database for the contact and then quits at step 16.

Various exemplary screen shots which are generated during execution of the program, according to the present invention, will now be described with reference to FIGS. 3-15 and examples 1-7 as follows.

Example 1

Retrieving an Existing Address from the Database

Figure 3:
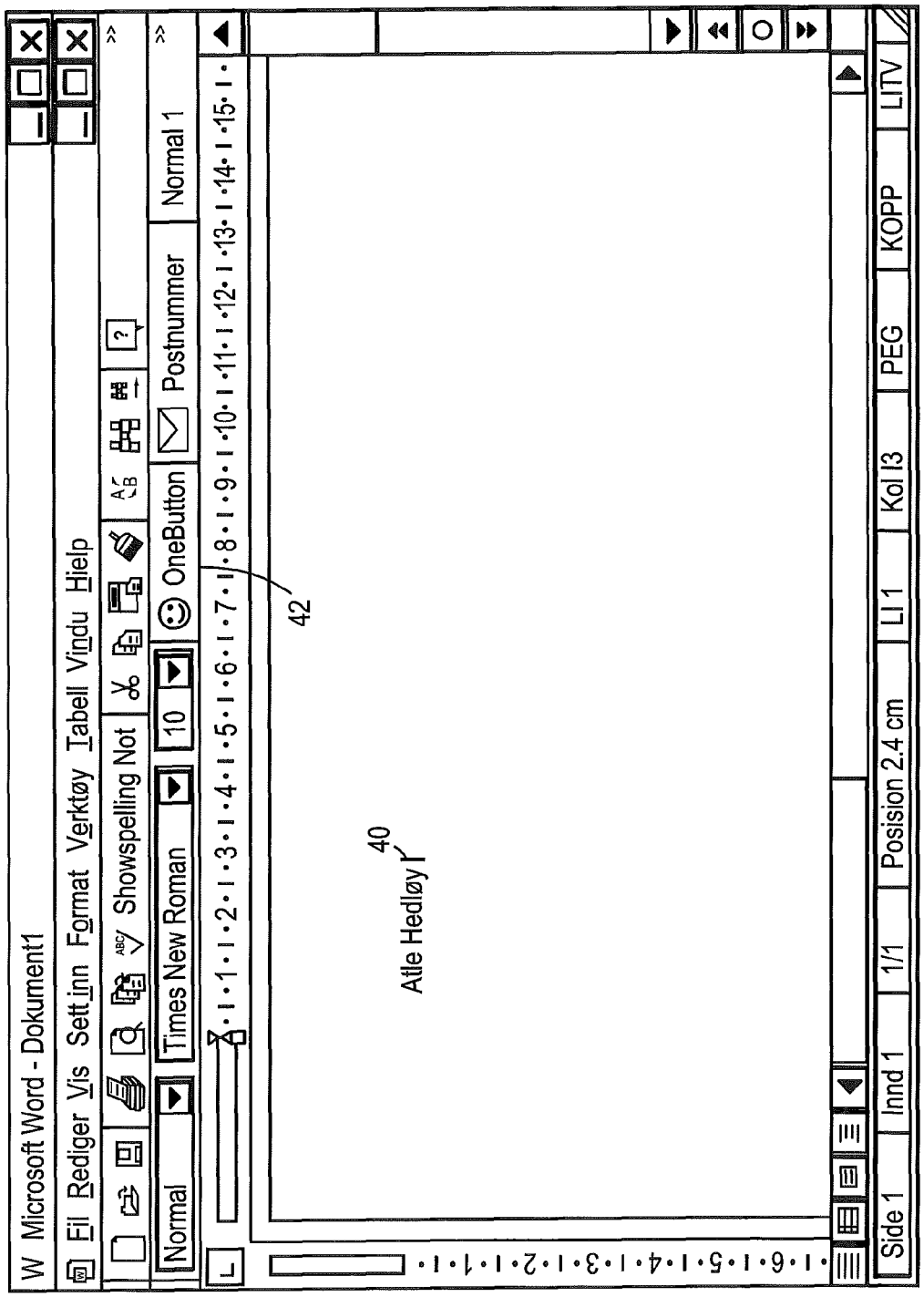
FIG. 3 is a screen shot illustrating the inputting of a name to be searched and an address handling button within a word processor, according to an exemplary embodiment of the present invention.

FIG. 3 illustrates a starting point in word processor document such as WORD document, wherein the user has typed a name 40. The user hits the button 42, for example, marked "OneButton" and the program according to the present invention retrieves the name 40 from the document, searches a database for the name 40, and inserts the retrieved address 44 associated with the name 40 into the document as shown in, for example, FIG. 4.

The above example corresponds to steps 2, 4, 6, 12, 18, 22 and 16 in the flow charts of FIGS. 1 and 2.

Example 2

Adding a New Contact to the Database

Figure 5:
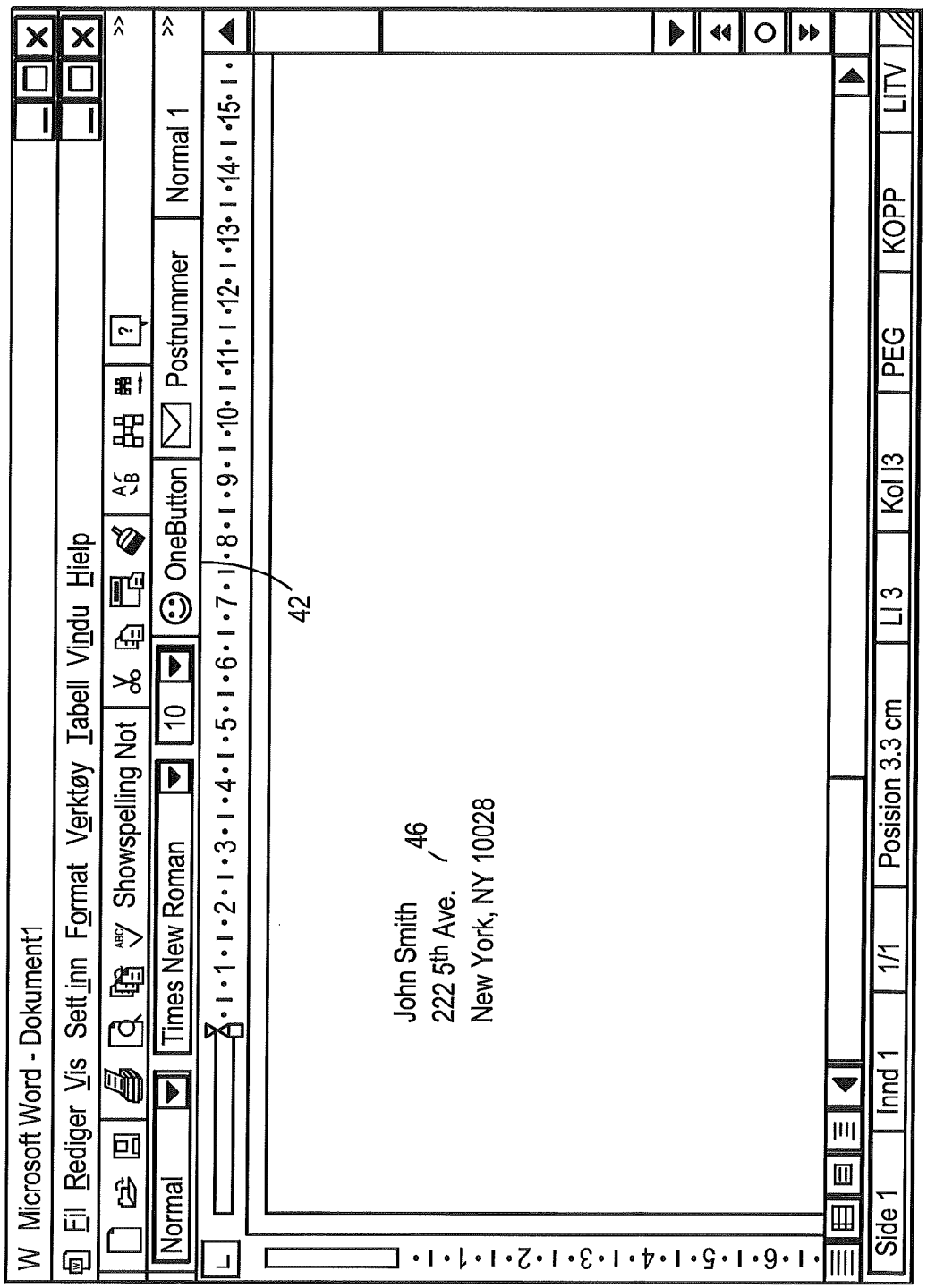
FIG. 5 is a screen shot illustrating the inputting of a name and address to be searched and an address handling button within a word processor, according to an exemplary embodiment of the present invention.
Figure 6:
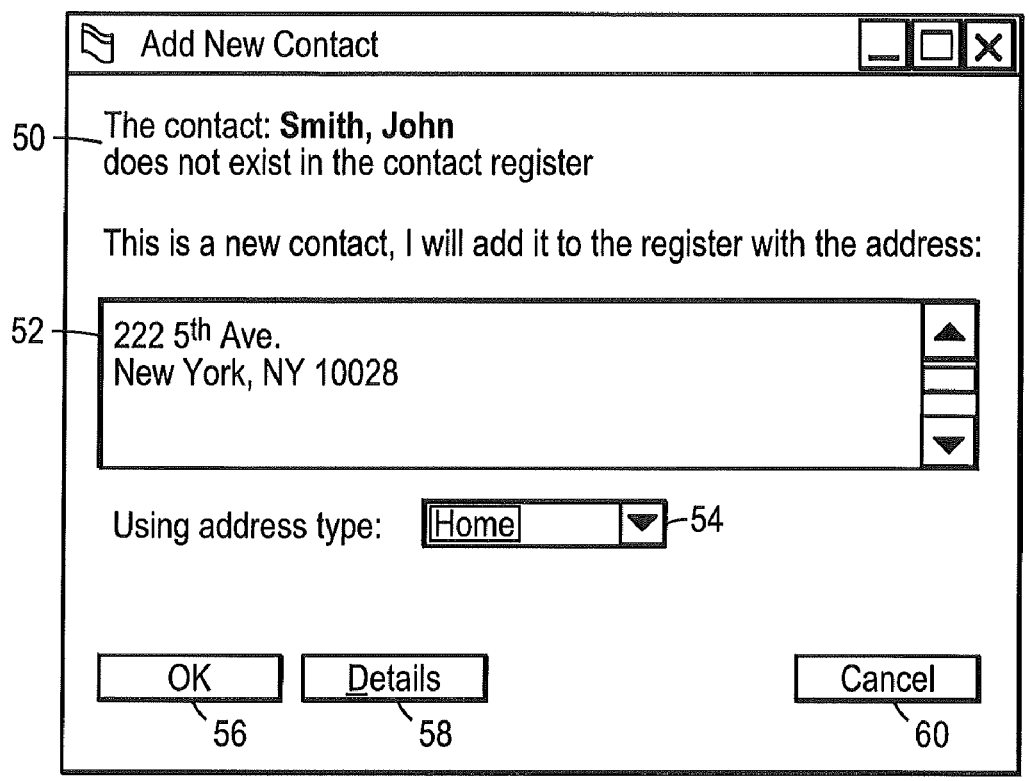
FIG. 6 is a screen shot illustrating an add new contact message window, according to an exemplary embodiment of the present invention.
Figure 8:
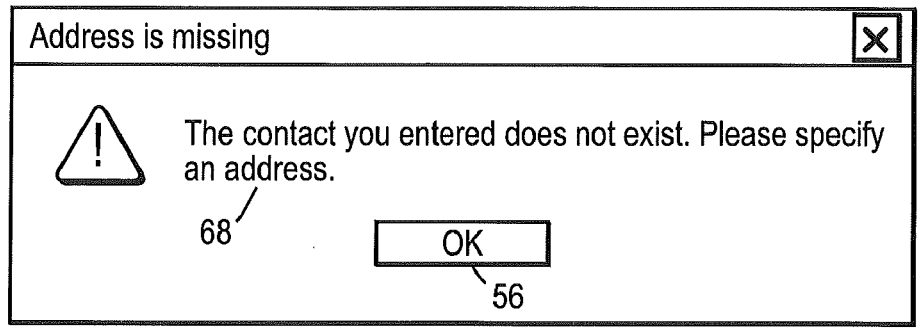
FIG. 8 is a screen shot illustrating an address missing message window, according to an exemplary embodiment of the present invention.
Figure 9:
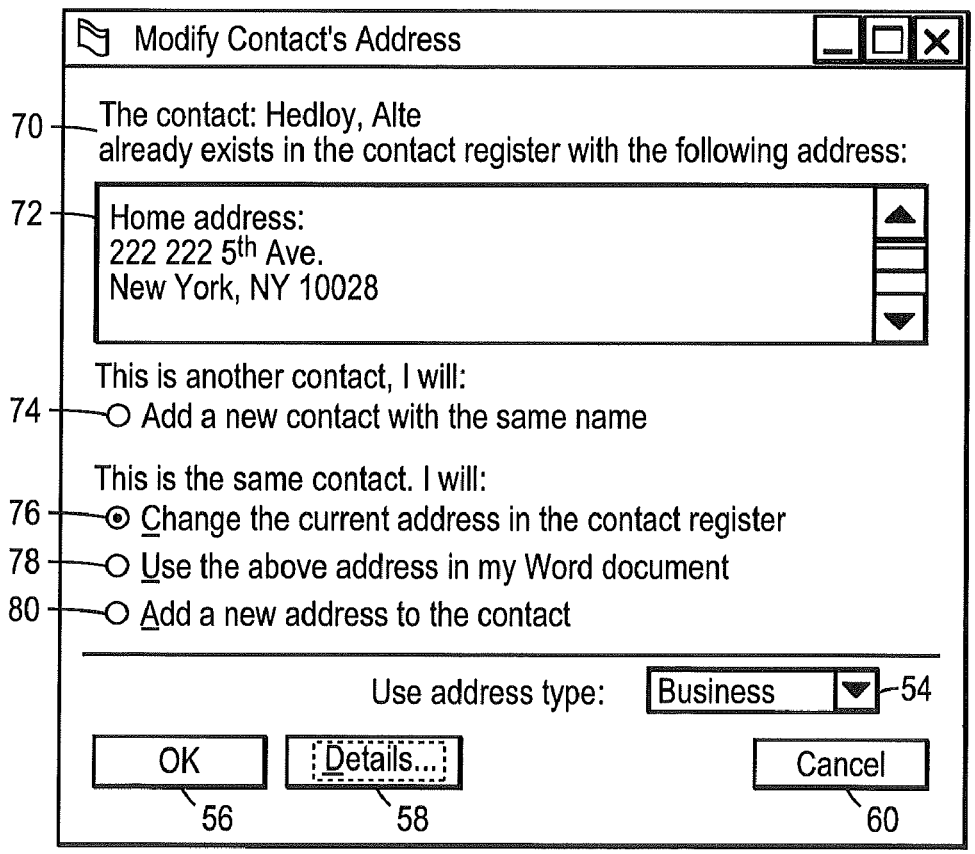
FIG. 9 is a screen shot illustrating a modify contact's address message window, according to an exemplary embodiment of the present invention.

FIG. 5 illustrates a starting point in word processor document such as WORD document, wherein the user has typed a name and address of a new contact 46. The user commands the button 42; for example, marked "OneButton," and the program according to the invention retrieves the new contact 46 from the document, searches a database for the name of the new contact 46 and generates a screen as shown in, for example, FIG. 6. This screen includes a message 50 informing the user that the new contact does not exist in the database, a message 52 including the address retrieved from the document, an address type selection 54, such as home, business, etc., and "OK," "Details," and "Cancel" buttons 56, 58, and 60, respectively.

At this point, the user can cancel the operation by commanding the Cancel button 60, ask the program to store data in the database and return the document by commanding the OK button 56, or check details before storing data into the database by commanding the Details button 58. If the user commands the Details button 58, as shown in, for example, FIG. 7, a message screen is provided so that the user can review and edit data 62 and the selection 54, store the data 62 and 54 in the database by commanding a "Add and Choose" button 64, see more options by commanding an "Options" button 66, or cancel the operation by commanding the Cancel button 60.

The above example corresponds to steps 2, 4, 6, 14, 26, 28 and 16 in the flow chart of FIG. 1 and steps 2, 4, 6, 14, 26, 27, 28 and 16 in the flow chart of FIG. 1 and steps 2, 4, 6, 26, 27, 28 and 16 in the flow chart of FIG. 2.

Example 3

Try to Retrieve Existing Address, but Contact is not in Database

FIG. 3 illustrates a starting point in word processor document, such as WORD document, wherein the user has typed a name of a contact 40. The user commands the button 42, for example, marked "OneButton," and the program according to the present invention retrieves the name 40 from the document, searches a database for the name of the contact 40 and generates a screen as shown in, for example, FIG. 8. This screen includes a message 68 informing the user that the contact does not exist in the database and to specify an address, and "OK" buttons 56. At this point when the user commands the OK button 56, the user returns to the document so that the contact's address can be included as in Example 2 above.

The above example corresponds to steps 2, 4, 6, 12, 18, 24, and 16 in the flow of charts of FIGS. 1 and 2.

Example 4

Adding a New Address for an Existing Contact (Short Version)

Figure 4:
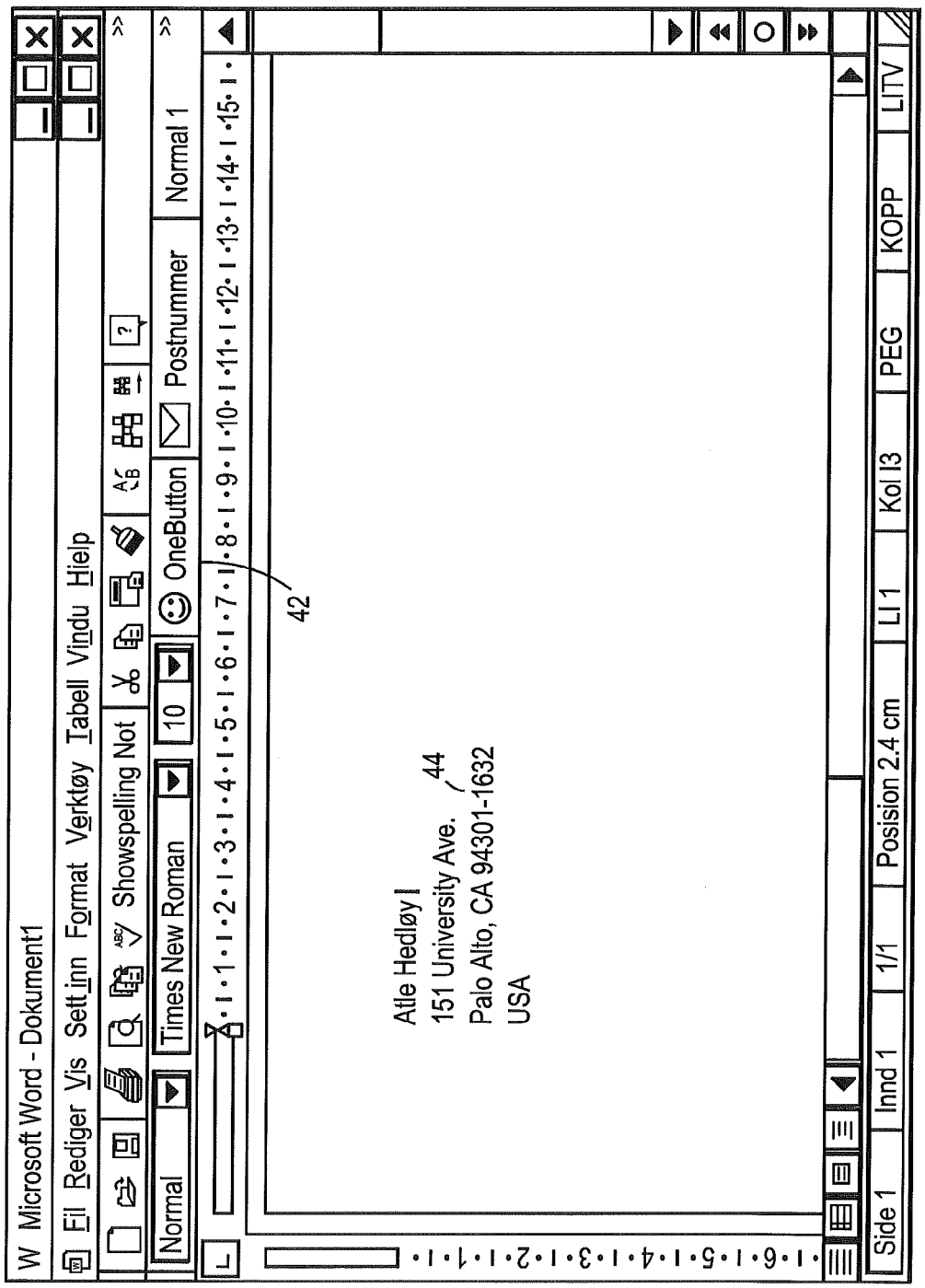
FIG. 4 is a screen shot illustrating a retrieved address in a word processor, according to an exemplary embodiment of the present invention.

FIG. 4 illustrates a starting point in word processor document, such as WORD document, wherein the user has typed a name and new address of an existing contact 44. The user commands the button 42, for example, marked "OneButton," and the program according to the present invention retrieves the existing contact 44 from the document, searches a database for the same name of the existing contact 44 and generates a screen as shown in, for example, FIG. 9. This screen includes a message 70 informing the user that the contact already exists in the database with an existing address, a message 72 including the existing address, add new contact with same name selection 74, change existing address selection 76, use existing address in document selection 78, add the new address contact selection 80, the address type selection 54, such as home, business, etc., and the "OK," "Details," and "Cancel" buttons 56, 58 and 60 respectively. AT this point, the user may select one of the four options 74-80, and command the OK button 56 to execute the selected options. The user can also cancel the operation by commanding the Cancel button 60, or check details before storing data into the database by commanding the Details button 58.

The above example corresponds to steps 2, 4, 6, 14, 26, 28, 30, 34, 36, and 16 in the flow chart of FIG. 1 and steps 2, 4, 6, 14, 26, 29, 31, 30, 28, 34, 36, and 16 in the flow chart of FIG. 2.

Example 5

Selecting Between Several Possible Matching Addresses

FIG. 3 illustrates a starting point in word processor document, such as WORD document, wherein the user has typed a name and possibly address of at least one existing contact 40. The user commands the button 42, for example, marked "OneButton," and the program according to the present invention retrieves the existing contact 40 from the document, searches a database for the name of the existing contact 40 and generates a screen as shown in, for example, FIG. 10. This screen includes a message informing the user the name corresponds to several addresses and possible contacts which already exist in the database, with existing contacts and addresses for selection 82, a message 84 including the full name and address for the contact that the user selects in 82; the Options button 66, a "Choose" button 86, a "Full details" button 88, a "More >>>" button 90, and the Cancel button 60. The above screen indicates to the user that at least one contact with the same name exists, and that there are more than one addresses and/or contacts that match.

Figure 11:
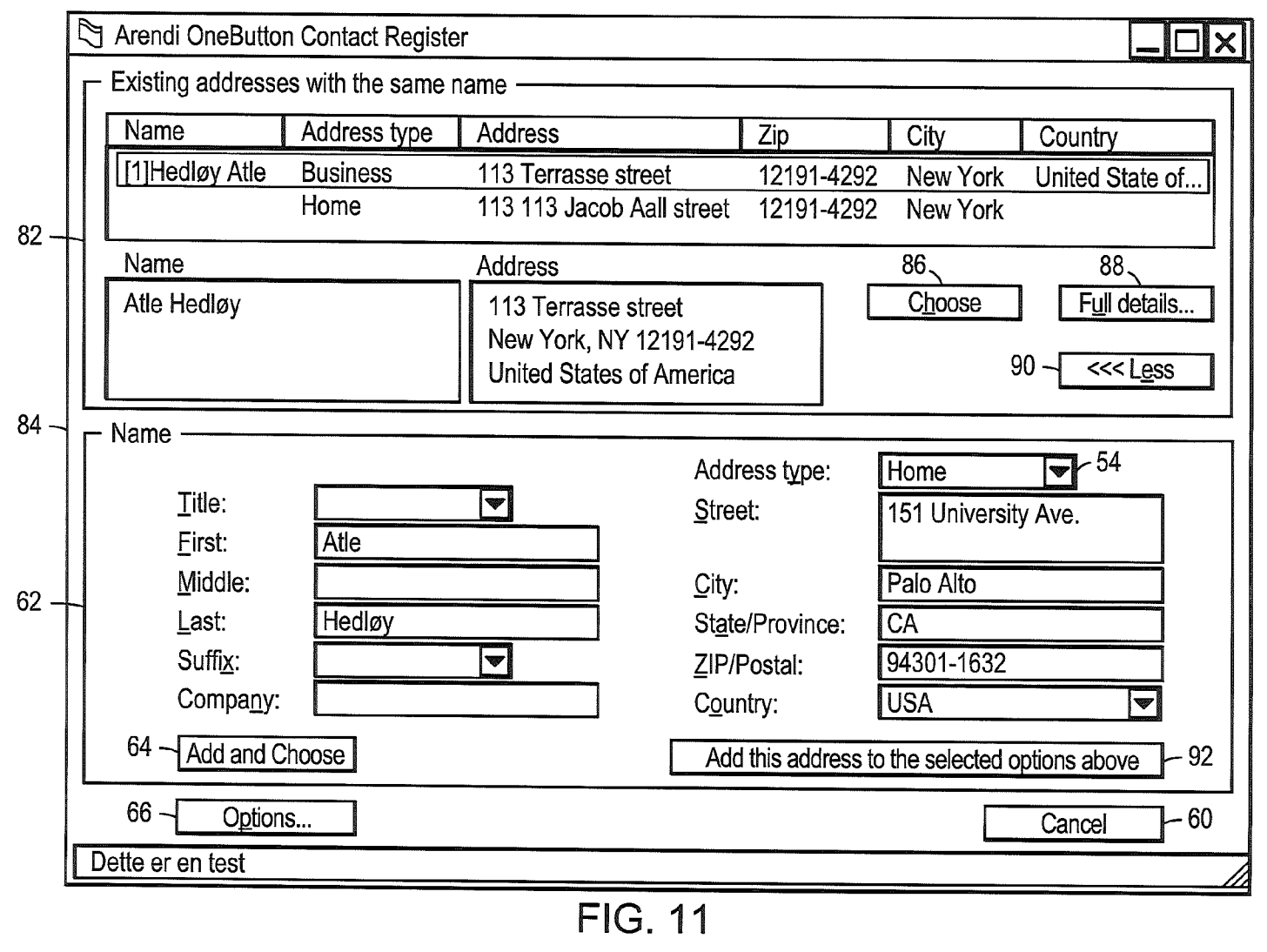

At this point the user may command the Choose button 86 to use the selected address and return to the document, or the user may command the More >>> button 90 to view how the program interpreted what the user typed in the word processor, and possibly change this data, wherein the program generates an updated screen as shown in, for example, FIG. 11. The updated screen includes the data 62 which displays the name typed in the word processor as interpreted by the program, address fields, and the fields for the address type selection 54, such as home, business, etc., which may be changed by the user before the program stores it in the database, the Add and Choose button 64, a "<<< Less" button 90 corresponding to the More >>> button 90 for returning to the screen of FIG. 10, and an "Add this address to the selected contact above" button 92. The user might then command the Add this address to the selected contact above button 92 and the result in the word processor is illustrated in FIG. 4. The user can also cancel the operations by commanding the Cancel button 60, or command the add choose button 64 to add this name and address as a new contact and address, or open the database before storing data into the database by commanding a "Full details" button 88 as will be later described.

The above example corresponds to steps 2, 4, 6, 12, 18, 20, 22, and 16 in the flow chart of FIG. 1 and steps 2, 4, 6, 12, 18, 20, 21, 22, and 16 in the flow chart of FIG. 2.

Example 6

Adding a New Address for an Existing Contact
(Long Version)

Figure 12:
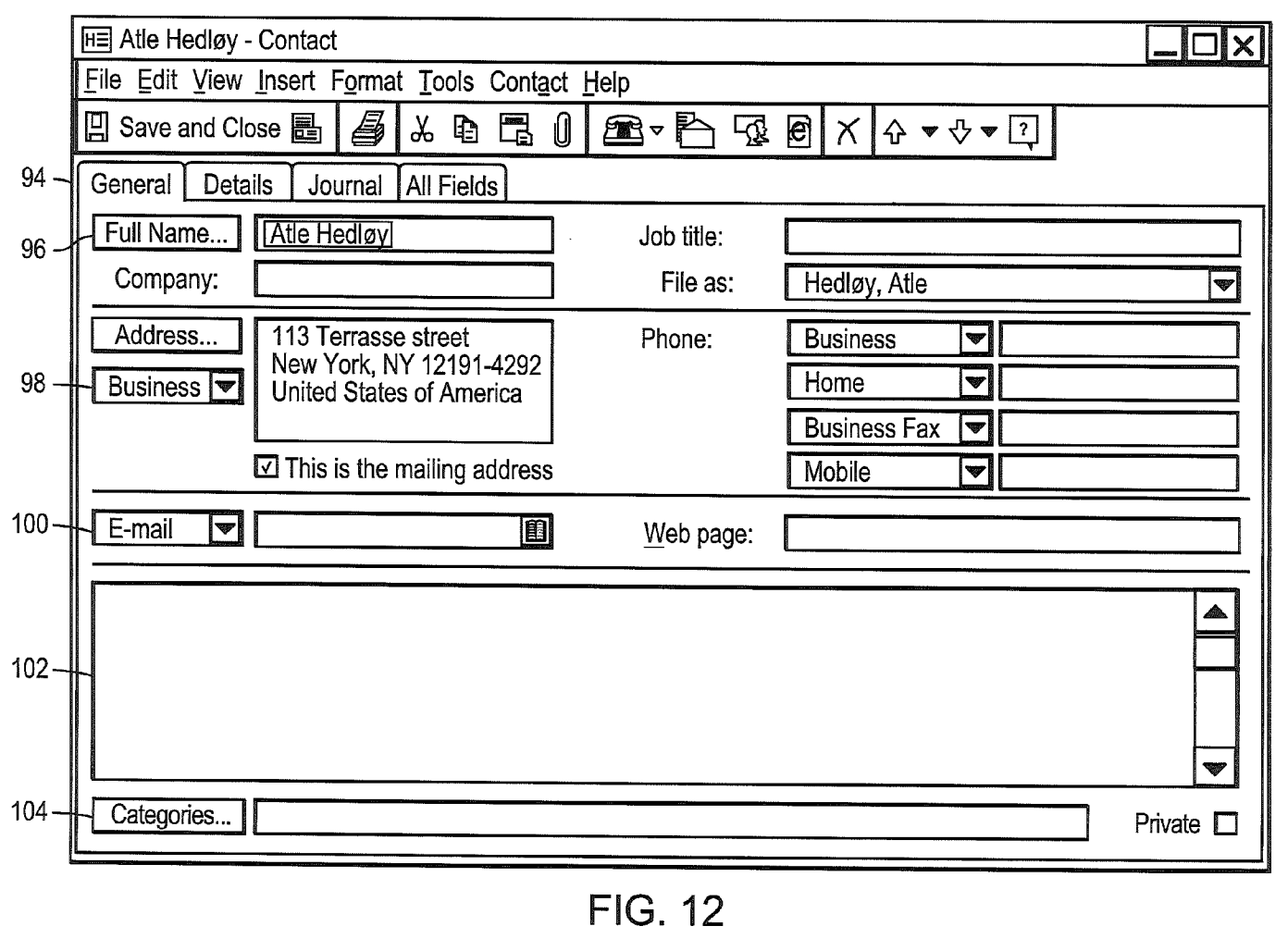

FIG. 4 illustrates a starting point in word processor document, such as WORD document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. As previously described the screen includes a message 70 informing the user that the contact already exists in the database with an existing address, and the user may command the Details button 58 to see the details of the new address for potentially modify the details before they are stored in the database and the program generates a screen as shown in, for example, FIG. 10. From this screen, the user may choose to use another address than the one he typed, and return to the document, or the user may command the "Full details" button 88 to enter a database program, such as OUTLOOK™, directly as shown in, for example, FIG. 12. In FIG. 12, the database program, such as OUTLOOK™, may include portions 94-104 for allowing the user to modify various pieces of data before they are stored in the database.

Figure 10:
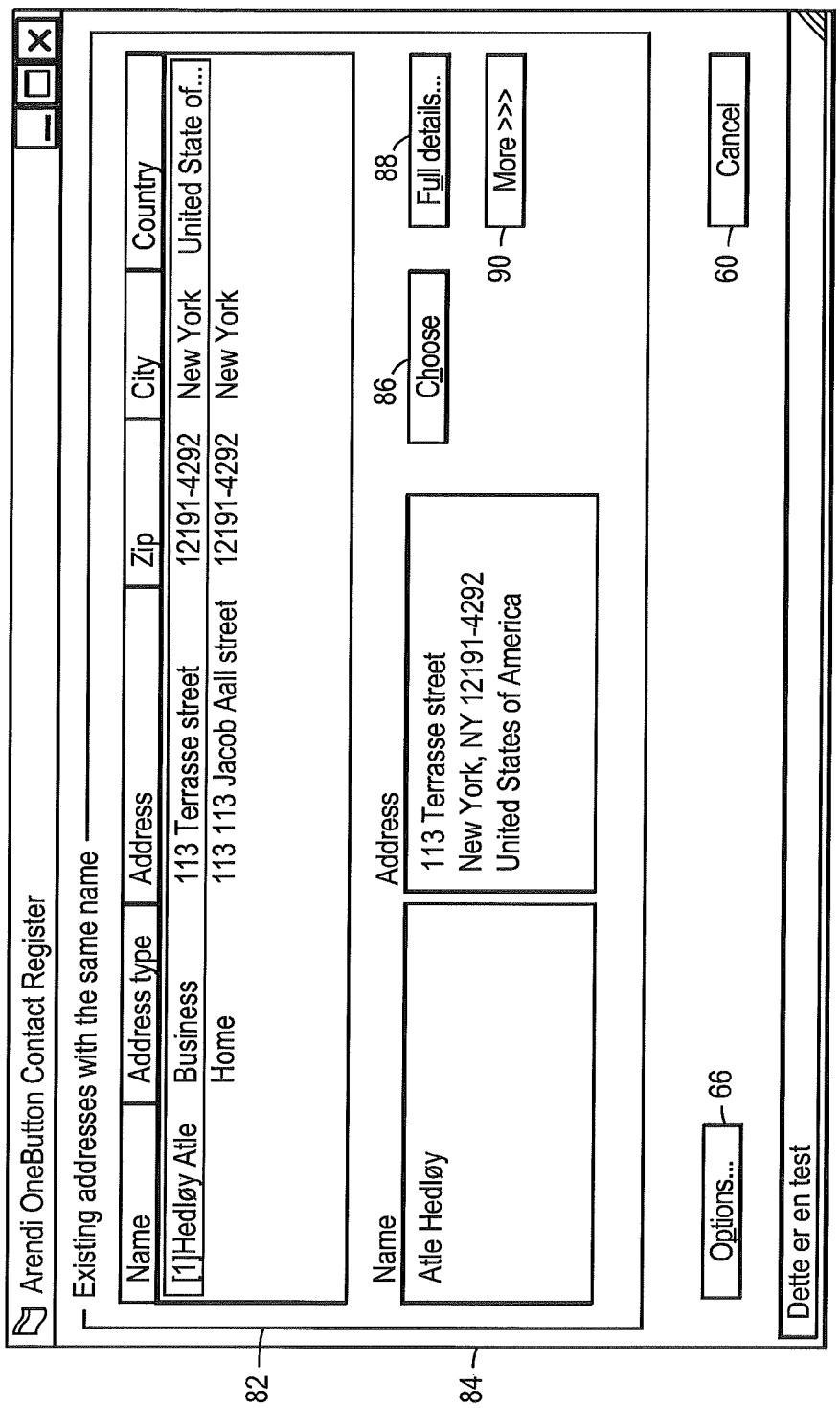
FIG. 10 is a screen shot illustrating a select a contact address register message window, according to an exemplary embodiment of the present invention.
Figure 13:
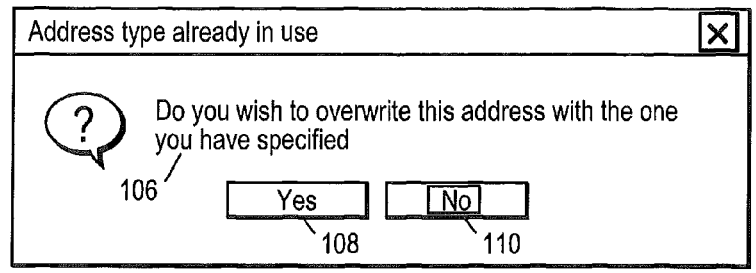
FIG. 13 is a screen shot illustrating an address already in use message window, according to an exemplary embodiment of the present invention.

Alternatively, in the screen shown in FIG. 10, the user may command the More >>> button 90 at which time the program generates the screen as shown in, for example, FIG. 11 and as previously described. In this screen, the user might then command the Add this address to the selected contact above button 92. If the address typed is already in use, the program generates a screen including a message 106, and "Yes" and "No" buttons, 108 and 110, respectively, as shown in, for example, FIG. 13. If the user hits the Yes button 108 the program overwrites the contact address with the address specified by the user (e.g., if the contact has moved) and the result in the word processor is shown in, for example FIG. 4.

The above example corresponds to steps 2, 4, 6, 12, 14, 26, 28, 30, 34, 36, and 16 in the flow chart of FIG. 1 and steps 2, 4, 6, 12, 14, 26, 29, 31, 30, 28, 34, 36, and 16 in the flow chart of FIG. 2.

Example 7

Spreadsheet Application

Figure 14:
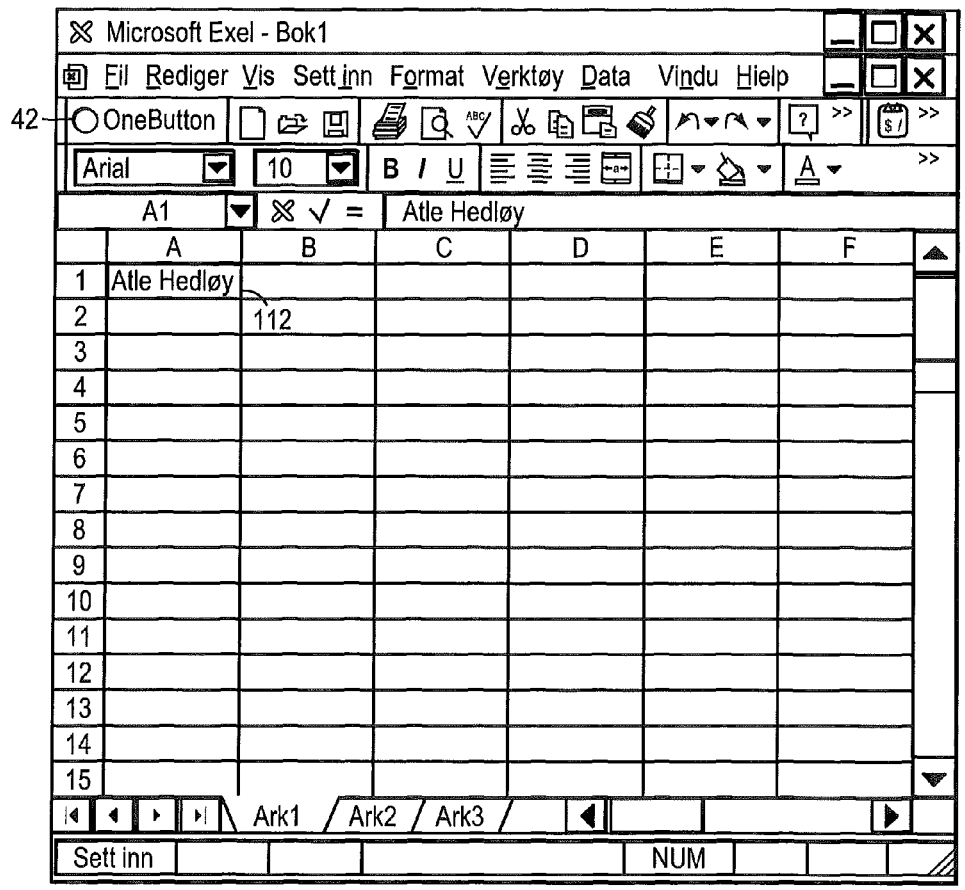
FIG. 14 is a screen shot illustrating the inputting of a name to be searched and an address handling button within a spreadsheet, according to an exemplary embodiment of the present invention.
Figure 15:
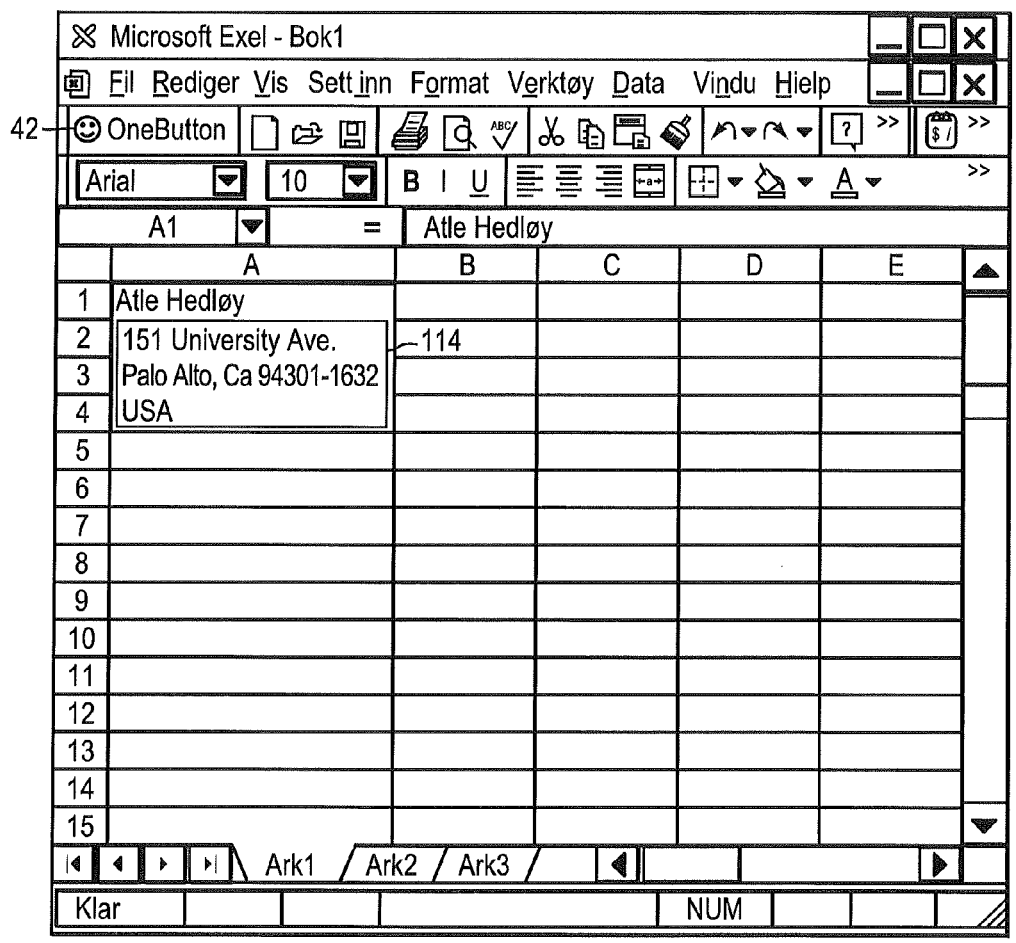
FIG. 15 is a screen shot illustrating a retrieved address in a spreadsheet, according to an exemplary embodiment of the present invention.

FIG. 14 illustrates a starting point in word processor document, such as an EXCEL spreadsheet, wherein the user has typed a name 112. The user hits the button 42, for example, marked "OneButton," and the program according to the present invention retrieves the name 112 from the spreadsheet, searches a database for the name 112, and inserts the retrieved address 114 into the spreadsheet as shown in, for example, FIG. 15. Accordingly, the examples 1-6 apply not only to word processor documents, such as WORD™ documents, etc., but to other word processor documents, and spreadsheets, such as EXCEL™ spreadsheets, etc.

The above example corresponds to steps 2, 4, 12, 18, 22, and 16 in the flow of charts FIGS. 1 and 2.

Figure 16:
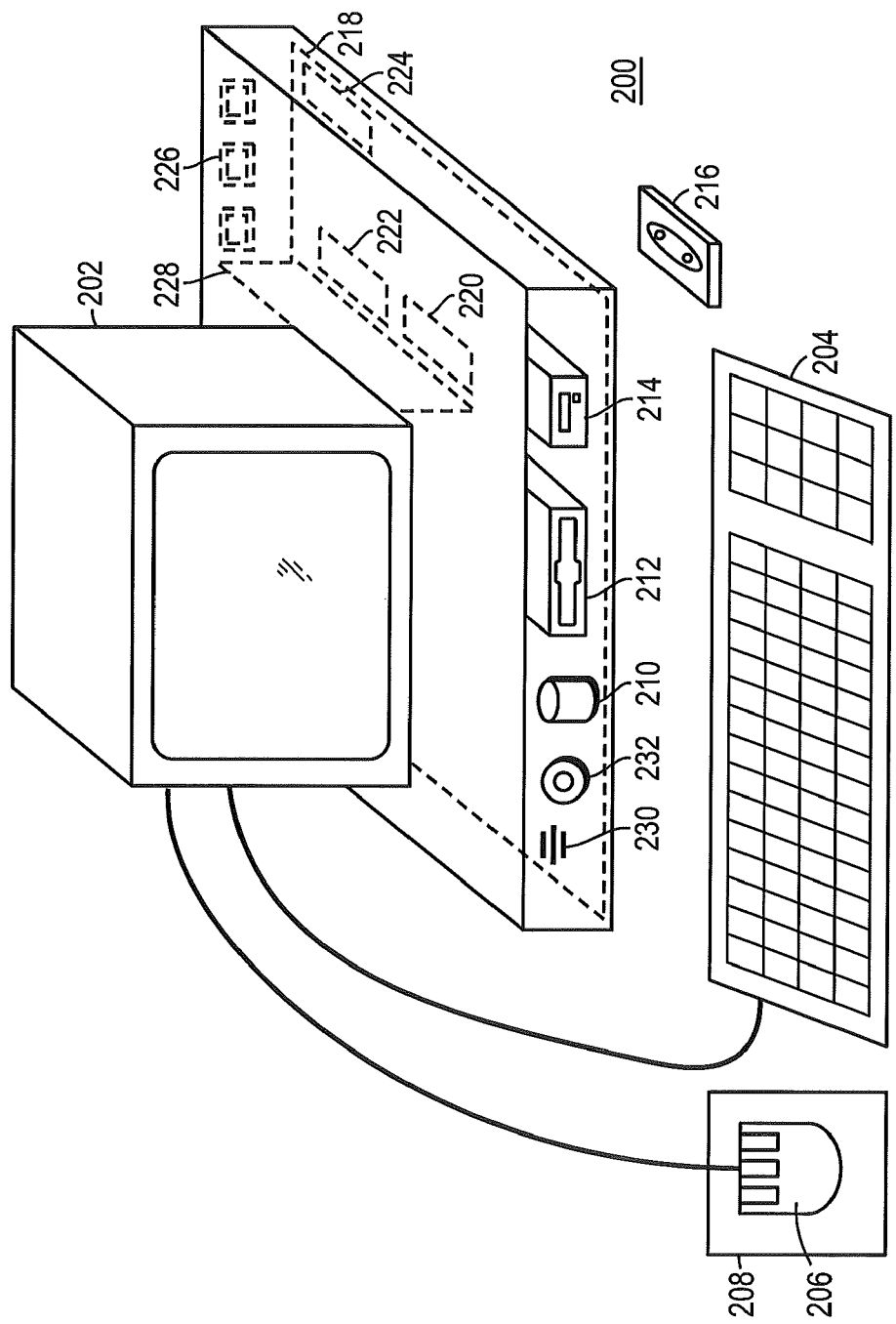
FIG. 16 is a schematic illustration of a general purpose computer for performing the processes of the present invention, according to an exemplary embodiment of the present invention.

FIG. 16 is a schematic illustration of a computer system for implementing the single button addressing according to the present invention. A computer 200 implements the method of the present invention, wherein the computer includes, for example, a display device 202, such as a conventional display device or a touch screen monitor with a touch screen interface, etc., a keyboard 204, a pointing device 206, a mouse pad or digitizing pad 208, a hard disk 210, or other fixed, high density media drives, connected using an appropriate device bus (e.g., a SCSI bus, an Ultra DMA bus, a PCI bus, etc.), a floppy drive 212, a tape or CD ROM drive 214 with tape or CD media 216, or other removable media devices, such as magneto-optical media, etc., and a mother board 218. The mother board 218 includes, for example, a processor 220, a RAM 222, and ROM 224 (e.g., DRAM, ROM, EPROM, EEPROM, SRAM, SDRAM, and Flash RAM, etc.), I/O ports 226 which may be used to couple to external devices, networks, etc., (not shown), and optional special purpose logic devices (e.g., ASICs) or configurable logic devices (e.g., GAL and re-programmable FPGA) 228 for performing specialized hardware/software functions, such as sound processing, image processing, signal processing, neural network processing, object character recognition (OCR) processing, etc., a microphone 230, and a speaker or speakers 232.

As stated above, the system includes at least one computer readable medium or alternatively, the computer readable medium may be accessed through various paths, such as networks, internet, drives, etc. Examples of computer readable media are compact discs, hard disks, floppy disks, tape, magneto-optical disks, PROMs (EPROM, EEPROM, Flash, EPROM), DRAM, SRAM, SDRAM, etc. Stored on any one or on a combination of computer readable media, the present invention includes software for controlling both the hardware of the computer 200 and for enabling the computer 200 to interact with a human user. Such software may include, but is not limited to, device drivers, operating systems and user applications, such as development tools. Such computer readable media further includes the computer program product of the present invention for performing any of the processes according to the present invention, described above (see, e.g., FIGS. 1-15). The computer code devices of the present invention can be any interpreted or executable code mechanism, including but not limited to scripts, interpreters, dynamic link libraries, Java classes, and complete executable programs, etc.

The invention may also be implemented by the preparation of application specific integrated circuits or by interconnecting an appropriate network of conventional component circuits, as will be readily apparent to those skilled in the art.

Address handling, according to this invention; is a significant simplification relative to existing methods, and requires little or no training on the part of a user, as correct addresses are retrieved with a minimal number of user commands, "clicks," keystrokes, etc. In addition, a program according to the present invention, can be programmed and created in most existing programming languages and be connected to most modern word processors. Therefore, according to the present invention, the process of creating and updating records in an address database is significantly simplified, since this may now be performed directly from the word processor.

Although the present invention is defined in terms of word processing documents, such as WORD™ documents and EXCEL™ spreadsheets, the present invention is applicable to all types of word processing documents such as NOTEPAD™, WORDPAD™, WORDPERFECT™, QUATRO PRO™, AMIPRO™, etc., as will be readily apparent to those skilled in the art.

Although the present invention is defined in terms of information management or database programs, such as OUTLOOK™ etc., the present invention is applicable to all types of information management or database programs such as ACCESS™, ORACLE™, DBASE™, RBASE™, CARDFILE™, including "flat files," etc., as will be readily apparent to those skilled in the art.

Although the present invention is defined in terms of providing an input device, such as a button 42 in a word processor for address handling therein, the present invention may be practiced with all types of input devices, such as touch screen, keyboard button, icon, menu, voice command device, etch, as will be readily apparent to those skilled in the art.

Although the present invention is defined in terms of a program retrieving information from a document before searching a database, the user may select the information in the document to be searched by the program in the database (e.g., by highlighting, selecting, italicizing, underlining, etc.), as will be readily apparent to those skilled in the art.

Although the present invention is defined in terms of a program retrieving a name or portion thereof from a document before searching a database the program may retrieve an address or portion thereof from the document before searching the database and insert, correct, complete, etc., the retrieved address based on the information found in the database corresponding to the retrieved address or portion thereof, as will be readily apparent to those skilled in the art.

Obviously, numerous modifications and variations of the present invention are possible in light of the above teachings. It is therefore to be understood that within the scope of appended claims, the invention may be practiced otherwise than as specifically described herein.

This application claims priority and contains subject matter related to Norwegian patent application No. 984066 filed on Sep. 3, 1998, the entire contents of which are hereby incorporated by reference.

What is claimed is:

1. A computer-implemented method for finding data related to the contents of a document using a first computer program running on a computer, the method comprising:

displaying the document electronically using the first computer program;

while the document is being displayed, analyzing, in a computer process, first information from the document to determine if the first information is at least one of a plurality of types of information that can be searched for in order to find second information related to the first information;

retrieving the first information;

providing an input device, configured by the first computer program, that allows a user to enter a user command to initiate an operation, the operation comprising (i) performing a search using at least part of the first information as a search term in order to find the second information, of a specific type or types, associated with the search term in an information source external to the document, wherein the specific type or types of second information is dependent at least in part on the type or types of the first information, and (ii) performing an action using at least part of the second information;

in consequence of receipt by the first computer program of the user command from the input device, causing a search for the search term in the information source, using a second computer program, in order to find second information related to the search term; and if searching finds any second information related to the search term, performing the action using at least part of the second information, wherein the action is of a type depending at least in part on the type or types of the first information.

2. A method according to claim 1, wherein the first information comprises at least one of name-, person-, company- and address-related information.

3. A method according to claim 2, wherein performing the action includes performing the action in the first computer program.

4. A method according to claim 1, wherein performing the action includes performing the action in the first computer program.

5. A method according to claim 4, wherein performing the action includes causing addition of at least part of the second information to the first information in the document.

6. A method according to claim 4, wherein performing the action includes causing display of at least part of the second information.

7. A method according to claim 4, wherein performing the action includes causing display of at least part of the second information by the first computer program.

8. A method according to claim 1, further comprising, providing a prompt for updating the information source to include the first information.

9. A method according to claim 1, further comprising, if the search is not successful, providing a prompt for updating the information source to include the first information.

10. A method according to claim 1, wherein receipt by the first computer program of the user command precedes analyzing the document.

11. A method according to claim 1, wherein analyzing the document is completed after the receipt of the user command is completed and before searching is initiated.

12. A method according to claim 1, wherein the input device is a graphical input device.

13. A method according to claim 1, wherein the user command is the only command from a user necessary to initiate performing the operation.

14. A method according to claim 1, wherein the input device is a menu and the entry of the user command includes a user's selection of the menu and click on a menu choice from the menu.

15. A method according to claim 1, further comprising, if searching results in a plurality of distinct instances of second information, displaying such instances to enable user selection of one of them for use in performing the action.

16. A method according to claim 1, wherein the information source is associated with the second computer program and is available on the computer.

17. A method according to claim 1, wherein the information source is associated with the second computer program and is available through the computer.

18. A method according to claim 1, wherein performing the action includes causing insertion of at least part of the second information into the document.

19. A method according to claim 1, wherein performing the action includes causing insertion of at least part of the second information into the document by the first computer program.

20. A computer-implemented method for finding data related to the contents of a document using a first computer program running on a computer, the method comprising:
displaying the document electronically using the first computer program;
while the document is being displayed, analyzing, in a computer process on the computer, first information from the document to determine if the first information is at least one of a plurality of types of information that can be searched for in order to find second information related to the first information, and wherein the first information comprises at least one of name-, person-, company-, and address-related information;
providing an input device, configured by the first computer program, that allows a user to enter a user command to initiate an operation, the operation comprising (i) performing a search using at least part of the first information as a search term in order to find the second information, of a specific type or types, associated with the search term in a user editable information source outside the document, wherein the specific type or types of second information is dependent at least in part on the type or types of the first information, and (ii) performing an action using at least part of the second information, wherein the input device includes a menu;
retrieving the first information;
in consequence of receipt by the first computer program of the user command, such user command including a user's selection of the menu and click on a menu choice from the menu, causing a search for the search term in the user editable information source, using a second computer program, in order to find second information related to the search term in the user editable information source; and
if searching finds any second information related to the search term, performing the action using at least part of the second information, wherein the action is of a type depending at least in part on the type or types of the first information and performing the action includes at least causing display of at least part of the second information.

21. A method according to claim 20, further comprising, if searching results in a plurality of occurrences of second information, causing display of such instances to enable user selection of one of them for use in performing the action.

22. A method according to claim 20, wherein performing the action includes causing addition of at least part of the second information to the first information in the document.

23. At least one non-transitory computer readable medium encoded with instructions which, when loaded on a computer, establish processes for finding data related to the contents of a document using a first computer program running on a computer, the processes comprising:
displaying the document electronically using the first computer program;
while the document is being displayed, analyzing, in a computer process, first information from the document to determine if the first information is at least one of a plurality of types of information that can be searched for in order to find second information related to the first information;
retrieving the first information;
providing an input device, configured by the first computer program, that allows a user to enter a user command to initiate an operation, the operation comprising (i) performing a search using at least part of the first information as a search term in order to find the second information, of a specific type or types, associated with the search term in an information source external to the document, wherein the specific type or types of second information is dependent at least in part on the type or types of the first information, and (ii) performing an action using at least part of the second information;
in consequence of receipt by the first computer program of the user command from the input device, causing a search for the search term in the information source, using a second computer program, in order to find second information related to the search term; and if searching finds any second information related to the search term, performing the action using at least part of the second information, wherein the action is of a type depending at least in part on the type or types of the first information.

24. At least one non-transitory computer readable medium according to claim 23, the instructions establishing processes wherein the first information comprises at least one of name-, person-, company- and address-related information.

25. At least one non-transitory computer readable medium according to claim 23, the instructions establishing processes wherein performing the action includes performing the action in the first computer program.

26. At least one non-transitory computer readable medium according to claim 24, the instructions establishing processes wherein performing the action includes performing the action in the first computer program.

27. At least one non-transitory computer readable medium according to claim 25, the instructions establishing processes wherein performing the action includes causing addition of at least part of the second information to the first information in the document.

28. At least one non-transitory computer readable medium according to claim 25, the instructions establishing processes wherein performing the action includes causing display of at least part of the second information.

29. At least one non-transitory computer readable medium according to claim 25, the instructions establishing processes wherein performing the action includes causing display of at least part of the second information by the first computer program.

30. At least one non-transitory computer readable medium according to claim 23, the instructions establishing processes comprising:
providing a prompt for updating the information source to include the first information.

31. At least one non-transitory computer readable medium according to claim 23, the instructions establishing processes comprising:
if the search is not successful, providing a prompt for updating the information source to include the first information.

32. At least one non-transitory computer readable medium according to claim 23, the instructions establishing processes wherein receipt by the first computer program of the user command precedes analyzing the document.

33. At least one non-transitory computer readable medium according to claim 23, the instructions establishing processes wherein analyzing the document is completed after the receipt of the user command is completed and before searching is initiated.

34. At least one non-transitory computer readable medium according to claim 23, the instructions establishing processes wherein the input device is a graphical input device.

35. At least one non-transitory computer readable medium according to claim 23, the instructions establishing processes wherein the user command is the only command from a user necessary to initiate performing the operation.

36. At least one non-transitory computer readable medium according to claim 23, the instructions establishing processes wherein the input device is a menu and the entry of the user command includes a user's selection of the menu and click on a menu choice from the menu.

37. At least one non-transitory computer readable medium according to claim 23, the instructions establishing processes comprising:
if searching results in a plurality of distinct instances of second information, displaying such instances to enable user selection of one of them for use in performing the action.

38. At least one non-transitory computer readable medium according to claim 23, the instructions establishing processes wherein the information source is associated with the second computer program and is available on the computer.

39. At least one non-transitory computer readable medium according to claim 23, the instructions establishing processes wherein the information source is associated with the second computer program and is available through the computer.

40. At least one non-transitory computer readable medium according to claim 23, the instructions establishing processes wherein performing the action includes causing insertion of at least part of the second information into the document.

41. At least one non-transitory computer readable medium according to claim 23, the instructions establishing processes wherein performing the action includes causing insertion of at least part of the second information into the document by the first computer program.

42. At least one non-transitory computer readable medium encoded with instructions which, when loaded on a computer, establish processes for finding data related to the contents of a document using a first computer program running on a computer, the processes comprising:
displaying the document electronically using the first computer program;
while the document is being displayed, analyzing, in a computer process on the computer, first information from the document to determine if the first information is at least one of a plurality of types of information that can be searched for in order to find second information related to the first information, and wherein the first information comprises at least one of name-, person-, company-, and address-related information;
providing an input device, configured by the first computer program, that allows a user to enter a user command to initiate an operation, the operation comprising (i) performing a search using at least part of the first information as a search term in order to find the second information, of a specific type or types, associated with the search term in a user editable information source outside the document, wherein the specific type or types of second information is dependent at least in part on the type or types of the first information, and (ii) performing an action using at least part of the second information, wherein the input device includes a menu;
retrieving the first information;
in consequence of receipt by the first computer program of the user command, such user command including a user's selection of the menu and click on a menu choice from the menu, causing a search for the search term in the user editable information source, using a second computer program, in order to find second information related to the search term in the user editable information source; and
if searching finds any second information related to the search term, performing the action using at least part of the second information, wherein the action is of a type depending at least in part on the type or types of the first information and performing the action includes at least causing display of at least part of the second information.

43. At least one non-transitory computer readable medium according to claim 42, the instructions establishing processes comprising:
　　if searching results in a plurality of occurrences of second information, causing display of such instances to enable user selection of one of them for use in performing the action.

44. At least one non-transitory computer readable medium according to claim 42, the instructions establishing processes wherein performing the action includes causing addition of at least part of the second information to the first information in the document.

* * * * *